United States Patent
Atlas et al.

(10) Patent No.: US 9,071,541 B2
(45) Date of Patent: *Jun. 30, 2015

(54) PATH WEIGHTED EQUAL-COST MULTIPATH

(75) Inventors: Alia Karin Atlas, Arlington, MA (US); John E. Drake, Pittsburgh, PA (US); David Ward, Los Gatos, CA (US); Ross W. Callon, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/536,487

(22) Filed: Jun. 28, 2012

(65) Prior Publication Data
US 2013/0286846 A1    Oct. 31, 2013

Related U.S. Application Data

(60) Provisional application No. 61/638,363, filed on Apr. 25, 2012.

(51) Int. Cl.
*H04L 12/725* (2013.01)
*H04L 12/911* (2013.01)
*H04L 12/803* (2013.01)
(Continued)

(52) U.S. Cl.
CPC ............... *H04L 45/24* (2013.01); *H04L 45/34* (2013.01); *H04L 45/302* (2013.01); *H04L 47/726* (2013.01); *H04L 47/125* (2013.01); *H04L 47/822* (2013.01)

(58) Field of Classification Search
CPC ............ H04L 12/5695; H04L 47/822; H04L 41/0896; H04L 41/12; H04L 45/50; H04L 47/10; H04L 47/20; H04L 47/2408; H04L 47/762; H04L 47/782; H04L 45/302; H04L 45/02; H04L 45/12; H04L 45/123
USPC .......................... 370/254–350; 709/201–213
See application file for complete search history.

(56) References Cited

U.S. PATENT DOCUMENTS

| 5,878,029 A | 3/1999 | Hasegawa et al. |
| 6,363,319 B1 | 3/2002 | Hsu |

(Continued)

OTHER PUBLICATIONS

Notice of Allowance from U.S. Appl. No. 13/536,669, dated May 2, 2014, 13 pp.

(Continued)

*Primary Examiner* — Ayaz Sheikh
*Assistant Examiner* — Debebe Asefa
(74) *Attorney, Agent, or Firm* — Shumaker & Sieffert, P.A.

(57) ABSTRACT

Routers balance network traffic among multiple paths through a network according to an amount of bandwidth that can be sent on an outgoing interface computed for each of the paths. For example, a router receives a link bandwidth for network links that are positioned between the first router and a second router of the network, and selects a plurality of forwarding paths from the first router to the second router. Upon determining that one of the network links is shared by multiple of the plurality of forwarding paths, the router computes a path bandwidth for each of the plurality of forwarding paths so as to account for splitting of link bandwidth of the shared network link across the multiple forwarding paths that share the network link. The router assigns packet flows to the forwarding paths based at least on the computed amount of bandwidth for each of the forwarding paths.

35 Claims, 8 Drawing Sheets

(51) Int. Cl.
*H04L 12/707* (2013.01)
*H04L 12/721* (2013.01)

(56) References Cited

U.S. PATENT DOCUMENTS

| | | |
|---|---|---|
| 6,538,416 B1 | 3/2003 | Hahne et al. |
| 6,765,921 B1 | 7/2004 | Stacey et al. |
| 6,831,895 B1 | 12/2004 | Ji et al. |
| 6,956,821 B2 | 10/2005 | Szviatovszki et al. |
| 7,031,312 B1 | 4/2006 | Jayakumar et al. |
| 7,039,706 B1 | 5/2006 | Parker et al. |
| 7,046,669 B1 | 5/2006 | Mauger et al. |
| 7,065,084 B2 | 6/2006 | Seo |
| 7,082,102 B1 | 7/2006 | Wright |
| 7,164,679 B2 | 1/2007 | Kotha et al. |
| 7,184,434 B2 | 2/2007 | Ganti et al. |
| 7,317,731 B2 | 1/2008 | Seddigh et al. |
| 7,324,453 B2 | 1/2008 | Wu et al. |
| 7,336,617 B1 | 2/2008 | Liu |
| 7,336,648 B1 | 2/2008 | Sasagawa |
| 7,369,571 B2 | 5/2008 | Choudhury et al. |
| 7,418,493 B1 | 8/2008 | Charny et al. |
| 7,489,695 B1 | 2/2009 | Ayyangar |
| 7,539,210 B2 | 5/2009 | Iovanna et al. |
| 7,558,199 B1 | 7/2009 | Minei et al. |
| 7,567,512 B1 | 7/2009 | Minei et al. |
| 7,606,235 B1 | 10/2009 | Ayyangar et al. |
| 7,839,850 B2 | 11/2010 | Kompella |
| 7,889,652 B1 * | 2/2011 | Minei et al. .................. 370/230 |
| 8,218,553 B2 * | 7/2012 | Kompella ................. 370/395.5 |
| 2003/0028670 A1 | 2/2003 | Lee et al. |
| 2003/0028818 A1 | 2/2003 | Fujita |
| 2003/0103510 A1 | 6/2003 | Svanberg et al. |
| 2003/0108051 A1 | 6/2003 | Bryden et al. |
| 2003/0117950 A1 | 6/2003 | Huang |
| 2003/0137971 A1 | 7/2003 | Gibson et al. |
| 2003/0185217 A1 | 10/2003 | Ganti et al. |
| 2003/0210705 A1 | 11/2003 | Seddigh et al. |
| 2004/0004955 A1 | 1/2004 | Lewis |
| 2004/0010617 A1 | 1/2004 | Akahane et al. |
| 2004/0042398 A1 | 3/2004 | Peleg et al. |
| 2004/0088965 A1 * | 5/2004 | Burchert .......................... 57/416 |
| 2005/0010685 A1 | 1/2005 | Ramnath et al. |
| 2005/0013242 A1 | 1/2005 | Chen et al. |
| 2005/0073958 A1 | 4/2005 | Atlas et al. |
| 2005/0088965 A1 * | 4/2005 | Atlas et al. .................... 370/216 |
| 2005/0125490 A1 | 6/2005 | Ramia |
| 2005/0169270 A1 | 8/2005 | Mutou et al. |
| 2005/0169313 A1 | 8/2005 | Okamura et al. |
| 2005/0243833 A1 | 11/2005 | Choudhury et al. |
| 2005/0265258 A1 | 12/2005 | Kodialam et al. |
| 2006/0013232 A1 | 1/2006 | Xu et al. |
| 2006/0018326 A1 | 1/2006 | Yucel |
| 2006/0039364 A1 | 2/2006 | Wright |
| 2006/0039391 A1 | 2/2006 | Vasseur et al. |
| 2006/0126536 A1 | 6/2006 | Patel et al. |
| 2006/0159009 A1 | 7/2006 | Kim et al. |
| 2006/0182035 A1 * | 8/2006 | Vasseur ......................... 370/238 |
| 2006/0182119 A1 | 8/2006 | Li et al. |
| 2006/0209785 A1 | 9/2006 | Iovanna et al. |
| 2006/0233137 A1 | 10/2006 | Dantu et al. |
| 2007/0133406 A1 | 6/2007 | Vasseur |
| 2007/0177505 A1 | 8/2007 | Charrua et al. |
| 2007/0268821 A1 | 11/2007 | Levit et al. |
| 2007/0268909 A1 | 11/2007 | Chen et al. |
| 2008/0019266 A1 | 1/2008 | Liu et al. |
| 2008/0049776 A1 | 2/2008 | Wiley et al. |
| 2008/0101239 A1 | 5/2008 | Goode |
| 2008/0123532 A1 | 5/2008 | Ward et al. |
| 2008/0144632 A1 | 6/2008 | Rabie et al. |
| 2008/0168510 A1 | 7/2008 | Small et al. |
| 2008/0175269 A1 * | 7/2008 | Alvarez et al. ................. 370/468 |
| 2008/0239959 A1 | 10/2008 | Shepherd et al. |
| 2008/0259936 A1 | 10/2008 | Hussain et al. |
| 2009/0003200 A1 | 1/2009 | So |
| 2009/0268605 A1 | 10/2009 | Campbell et al. |
| 2011/0134769 A1 | 6/2011 | Lee et al. |

OTHER PUBLICATIONS

Office Action from U.S. Appl. No. 13/536,669, dated Jan. 9, 2014, 24 pp.
Response to Office Action mailed Nov. 1, 2013, from U.S. Appl. No. 13/112,961, made on Feb. 3, 2014, 17 pp.
Final Office Action from U.S. Appl. No. 13/112,961, dated Mar. 4, 2014, 18 pp.
Response to Office Action dated Jan. 9, 2014, from U.S. Appl. No. 13/536,669, dated Apr. 9, 2014, 17 pp.
D. Awduche et al., "RFC 3209—RSVP-TE: Extensions to RSVP for LSP Tunnels," Network Working Group, Dec. 2001, 47 pp.
RSVP-TE: Resource Reservation Protocol—Traffic Extension, Javvin Company, Feb. 14, 2005, 2 pp.
Quality of Service and Traffic Engineering Using Multiprotocol Label Switching; PowerPoint presentation, R. Jain—Ohio State University, Aug. 1999, 90 pp.
Kim et al., QoS-Guaranteed DiffServ-Aware-MPLS Traffic Engineering with Controlled Bandwidth Borrowing, Lecture Notes in Computer Science, 2004, 13 pp.
Davie et al., RFC 3035; MPLS Using LDP and ATM VC Switching; Jan. 2001, 18 pp.
A Solution for Managing Quality of Service in Internet Protocol Networks; M. Vapa Master's Thesis, University of Jyvaskyla, Dec. 14, 2000, 91 pp.
Advance Reservations of Bandwidth in Computer Networks; L.O. Burhard, 2004 Citeseer, 177 pp.
An MPLS-Based Quality of Service Architecture for Heterogeneous Networks; S. Raghavan, Nov. 12, 2001, 107 pp.
IP/MPLS based VPNs, Layer-3 vs Layer-2; Ahmed Abdelhalim, Foundry Networks, 2002, 16 pp.
QoS and Traffic Engineering; MPLS, DiffServ and Constraint Based Routing, Singh et al. May 2000, 31 pp.
Ayyangar et al., "Inter-region MPLS Traffic Engineering", Jun. 2003, Network Working Group Internet Draft, draft-ayyangar-inter-region-te-00.txt, 21 pp.
Ayyangar et al., "Label Switched Patch Stitching with Generalized Multiprotocol Label Switching Traffic Engineering (GMPLS TE)," RFC 5150, Feb. 2008, 18 pp.
Katz et al., "Traffic Engineering (TE) Extensions to OSPF Version 2," RFC 3630, Sep. 2003, 15 pp.
Kompella et al., "Link Building in MPLS Traffic Engineering (TE)," RFC 4201, Oct. 2005, 12 pp.
Kompella et al., "Label Switched Paths (LSP) Hierarchy with Generalized Multi-Protocol Label Switching (GMPLS) Traffic Engineering (TE)," RFC 4206, Oct. 2005, 15 pp.
Lang, "Link Management Protocol (LMP)," RFC 4204, Oct. 2005, 81 pp.
Minei et al., "Extensions for Differentiated Services-aware Traffic Engineered LSPs," draft-minei-diffserv-te-multi-class-02.txt, Jun. 2006, 11 pp.
Polk et al., "A Resource Reservation Protocol (RSVP) Extension for the Reduction of Bandwidth of a Reservation Flow," RFC 4495, May 2006, 22 pp.
Rosen et al., "Multiprotocol Label Switching Architecture," RFC 3031, Jan. 2001, 57 pp.
Shiomoto et al., "Procedures for Dynamically Signaled Hierarchical Label Switched Paths," draft-ietf-ccamp-lsp-hierarchy-bis-08.txt, Feb. 27, 2010, 30 pp.
Zamfir et al., "Component Link Recording and Resource Control for TE Link Bundles," draft-ietf-mpls-explicit-resource-control-bundle-07.txt, May 25, 2010, 13 pp.
Zimmermann, "OSI Reference Model—The ISO Model of Architecture for Open Systems Interconnection," IEEE Transactions on Communications, vol. 28, No. 4, Apr. 1980, pp. 425-432.
Giacalone et al. "OSPF Traffic Engineering (TE) Express Path," Network Working Group, Internet-Draft, Sep. 21, 2011, 15 pp.
Kompella et al. "The Use of Entropy Labels in MPLS Forwarding," Network Working Group, Internet-Draft, Oct. 31, 2011, 25 pp.

(56) References Cited

OTHER PUBLICATIONS

Kompella "Multi-path Label Switched Paths Signaled Using RSVP-TE," Network Working Group, Internet-Draft, Oct. 31, 2011, 19 pp.
Bryant et al. "Flow-Aware Transport of Pseudowires over an MPLS Packet Switched Network," Internet Engineering Task Force (IETF), RFC 6391, Nov. 2011, 19 pp.
Office Action from U.S. Appl. No. 10/928,572, dated May 14, 2008, 11 pp.
Response to Office Action dated May 14, 2008, from U.S. Appl. No. 10/928,572, filed Sep. 15, 2008, 14 pp.
Final Office Action from U.S. Appl. No. 10/928,572, dated Dec. 12, 2008, 14 pp.
Notice of Allowance for U.S. Appl. No. 10/928,572, dated Jun. 2, 2009, 4 pp.
Office Action from U.S. Appl. No. 12/508,375, dated Jun. 2, 2010, 10 pp.
Response to Office Action dated Jun. 2, 2010, from U.S. Appl. No. 12/508,375, filed Aug. 18, 2010, 2 pp.
Notice of Allowance for U.S. Appl. No. 12/508,375, dated Oct. 7, 2010, 4 pp.
U.S. Appl. No. 13/112,961, filed May 20, 2011.
U.S. Appl. No. 13/536,669, filed Jun. 28, 2012.
Office Action from U.S. Appl. No. 13/112,961, dated Nov. 1, 2013, 16 pp.
Extended European Search Report mailed May 29, 2013, in corresponding EP Application No. 12197695.5, 7 pp.

* cited by examiner

PATH WEIGHTED EQUAL-COST MULTIPATH

This application claims the benefit of U.S. Provisional Patent Application 61/638,363 filed Apr. 25, 2012, the entire content of which is incorporated herein by reference.

TECHNICAL FIELD

This disclosure relates to computer networks and, more particularly, to distributing traffic load within a network.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

Computer networks may have parallel data paths. For example, a network may have a number of interconnected intermediate devices that provide connectivity from an inbound edge router to an outbound edge router. In a conventional routed network, the inbound edge router makes routing decisions to forward traffic to the outbound edge router. Based on information within each packet and routing information learned by operation of routing protocols, the inbound edge router selects a neighboring "next hop" router and forwards the packet out on an outbound physical link coupling the router to the selected next hop router. For example, the inbound edge router may choose the lowest cost physical link when selecting the next hop. In some cases the inbound edge router attempts to load balance when forwarding packets to the next hop routers, i.e., the neighboring routers coupled to its outgoing physical links. As a result, some of the packets traveling between two locations may make use of one path, while other packets may make use of one or more alternate paths.

SUMMARY

In general, techniques are described for load balancing network traffic among multiple paths through a network to a destination according an amount of bandwidth computed for each of the paths. The computed amount of bandwidth defines an amount of bandwidth that can be sent on an outgoing interface of a network device for sending network traffic on one of the multiple paths to the destination.

In accordance with the techniques of this disclosure, the computing router can compute the amount of bandwidth for each of the forwarding paths in a manner that takes into account downstream network links shared by multiple paths, as well as issues that affect how downstream routers split their traffic among their own forwarding paths to the destination. For example, downstream routers along the equal-cost forwarding paths may not all be configured with the weighted equal-cost multipath (ECMP) algorithms described herein, and instead may evenly load balance between outgoing interfaces associated with equal-cost forwarding paths without regard to what occurs downstream, i.e., toward the destination. The computing router can take the behaviors of downstream routers into account when making its own determination of path bandwidths and corresponding load balancing splits. The computing router can learn of a downstream router's capabilities through capabilities advertisements that indicate whether the downstream router has a capability to account for splitting of link bandwidth for a shared network link across the multiple forwarding paths that share the network link.

The network device, such as a router, may identify and select multiple forwarding paths through the network to the destination. The multiple forwarding paths may be non-looping paths that may each satisfy one or more constraints, such as multiple forwarding paths that present the same cost to the destination. The multiple selected forwarding paths are referred to generally herein as "equal-cost" forwarding paths, although in some example aspects the selected forwarding paths are non-looping paths that may not all have equal costs. The router may receive an advertised link bandwidth or other constraint information from other routers in the network for each of the network links along the selected forwarding paths.

As an example, a single network link along the equal-cost forwarding paths may be shared by more than one of the equal-cost forwarding paths. That is, paths from different next-hop routers can overlap and need to share one or more common links downstream. In one aspect, upon determining that one of the network links is shared by multiple of the plurality of equal-cost forwarding paths, the computing router can compute the amount of bandwidth that can be sent on an outgoing interface to the next-hop routers so as to account for splitting of link bandwidth of the shared network link across the multiple equal-cost forwarding paths that share the network link.

In some examples, the router may subsequently compute a weight for each outgoing interface that is proportional to the computed amount of bandwidth for each outgoing interface. The router thereafter allocates and forwards, on a per-packet flow basis for example, network traffic to corresponding next-hops for the different equal-cost forwarding paths in proportion to the respective weights computed by the router for the outgoing interface.

The techniques of this disclosure may present one or more advantages. For example, applying the techniques to allocate network traffic among equal-cost forwarding paths of an ECMP set according to respective overall computed path bandwidths along the paths may increase the amount of network traffic carried by high path bandwidth paths relative to low path bandwidth paths. This may reduce a likelihood of congestion within the ECMP set and improve network throughput. The techniques of this disclosure can therefore allow for use of different network architectures, and may also reduce the need for simultaneous equal link upgrades. The weighted ECMP techniques described herein can be applied not only to Internet Protocol (IP) and Label Distribution Protocol (LDP) traffic, but also to Resource Reservation Protocol with Traffic Engineering extensions (RSVP-TE) traffic, including RSVP-TE multi-path traffic when sub-LSPs are signaled without bandwidth reservation.

In one example aspect, a method includes receiving, with a first router of a network, a link bandwidth for each of one or more network links of the network that are positioned between the first router and a second router of the network, selecting, with the first router, a plurality of forwarding paths from the first router to the second router that each satisfy a constraint, and, upon determining that one of the network links is shared by multiple of the plurality of forwarding paths, by the first router, computing an amount of bandwidth that can be sent on an outgoing interface of the first router to a neighbor node on the multiple forwarding paths that share the one of the network links, wherein computing the amount of bandwidth comprises accounting for splitting of the link bandwidth of the shared network link across the multiple forwarding paths that share the network link, and accounting for a downstream router that does not account for splitting of the link bandwidth for the shared network link across the multiple forwarding paths that share the network link when the downstream router computes an amount of bandwidth that can be sent on an outgoing interface of the downstream router. The method also includes selectively assigning, with the first router, packet flows to each of a plurality of outgoing interfaces of the first router based at least on the computed amount of bandwidth, receiving packets for the packet flows with the first router, and forwarding packets of each of the packets flows to the respective one of the plurality of outgoing interfaces to which the packet flow is assigned.

In another example aspect, a network device includes a control unit comprising one or more processors, and a routing protocol software of the control unit to receive a link bandwidth for each of one or more network links of a network that are positioned between the network device and a second network device of the network, wherein the routing protocol software is to execute a routing protocol to select plurality of forwarding paths from the network device to the second network device that each satisfy a constraint. The network device also includes a path weight calculator of the control unit to, upon determining that one of the network links is shared by multiple of the plurality of forwarding paths, compute an amount of bandwidth that can be sent on an outgoing interface of the first router to a neighbor node on the multiple forwarding paths that share the one of the network links, wherein in computing the amount of bandwidth the path weight calculator accounts for splitting of the link bandwidth of the shared network link across the multiple forwarding paths that share the network link, and accounts for a downstream router that does not account for splitting of the link bandwidth for the shared network link across the multiple forwarding paths that share the network link when the downstream router computes an amount of bandwidth that can be sent on an outgoing interface of the downstream router. The network device further includes a multipath forwarding component of the control unit to selectively assign packet flows to each of a plurality of outgoing interfaces of the first router based at least on the computed amount of bandwidth, and one or more interface cards to receive packets for the packet flows, wherein the multipath forwarding component forwards packets of each of the packets flows to the respective one of the plurality of outgoing interfaces to which the packet flow is assigned.

In another example aspect, a computer-readable storage medium includes instructions that cause a programmable processor to receive a link bandwidth for each of one or more network links of a network that are positioned between a first router and a second router of the network; select a plurality of forwarding paths from the first router to the second router that each satisfy a constraint, and upon determining that one of the network links is shared by multiple of the plurality of equal-cost forwarding paths, compute an amount of bandwidth that can be sent on an outgoing interface of the first router to a neighbor node on the multiple forwarding paths that share the one of the network links, wherein computing the amount of bandwidth comprises accounting for splitting of the link bandwidth of the shared network link across the multiple forwarding paths that share the network link, and accounting for a downstream router that does not account for splitting of the link bandwidth for the shared network link across the multiple forwarding paths that share the network link when the downstream router computes an amount of bandwidth that can be sent on an outgoing interface of the downstream router. The instructions further include instructions to selectively assign packet flows to each of a plurality of outgoing interfaces of the first router based at least on the computed amount of bandwidth, receive packets for the packet flows with the first router, and forward packets of each of the packets flows to the respective one of the plurality of outgoing interfaces to which the packet flow is assigned.

The details of one or more aspects of this disclosure are set forth in the accompanying drawings and the description below. Other features, objects, and advantages will be apparent from the description and drawings, and from the claims.

DETAILED DESCRIPTION

Figure 1:
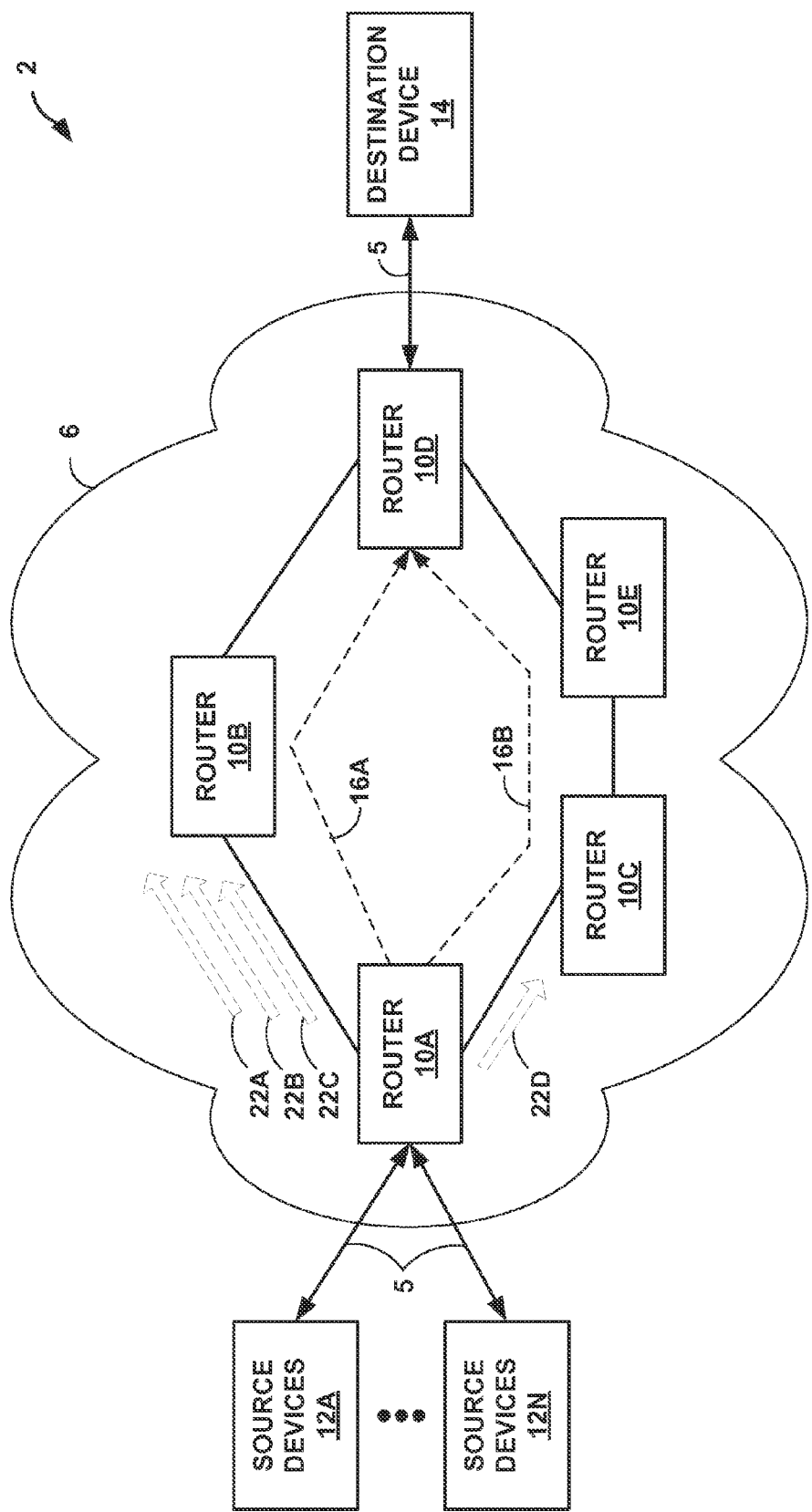
FIG. 1 is a block diagram illustrating an example network system that performs weighted equal-cost multipath (ECMP) techniques described in this disclosure.

FIG. 1 is a block diagram illustrating an example network system 2 that performs example weighted equal-cost multipath (ECMP) techniques described in this disclosure. Network 6 includes routers 10A-10E ("routers 10") that route network packets, received from source devices 12A-12N ("source devices 12"), toward destination device 14. Network 6 may comprise a public network, such as the Internet, a private network, such as those owned and operated by an enterprise or service provider, or a combination of both public and private networks. As a result, network 6 may be alternately referred to herein as a Service Provider (SP) network. Network 6 may include one or more Wide Area Networks (WANs), Local Area Networks (LANs), Virtual Local Area Networks (VLANs), Virtual Private Networks (VPNs), and/or another type of network.

In some instances, network 6 may be an Internet Protocol network in which routers 10 use IP forwarding for transporting network packets. In other instances, network 6 may be a label switching network in which network devices such as routers 10, often referred to as Label Switching Routers or LSRs, use Multi-Protocol Label Switching (MPLS) signaling protocols to establish Label Switched Paths (LSPs) for transporting the network packets received from source devices 12. The MPLS data-carrying mechanism of network 6 may be viewed as lying between layer 2 and layer 3 of the Open Systems Interconnection (OSI) model and is often referred to as a layer 2.5 protocol. Reference to layers followed by a numeral may refer to a particular layer of the OSI model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. Further information regarding MPLS and the various features of MPLS, as well as, general architectural information regarding MPLS can be found in Request for Comments (RFC) 3031, titled "Multiprotocol Label Switching Architecture," prepared by the Network Working Group of the Internet Engineering Task Force (IETF), dated January 2001, incorporated by reference herein. In some instances, network 6 may offer Generalized MPLS (GMPLS). Although described herein in some instances with respect to MPLS, the techniques of this disclosure are also applicable to GMPLS.

Thus, although shown as a single network 6 in FIG. 1, network 6 may comprise any number of interconnected networks, either public or private, in which the various networks interconnect to form various virtual networks. In addition, network 6 may include a variety of other network devices for forwarding network traffic, such as additional routers, switches, or bridges. The particular configuration of network system 2 is merely an example, and routers 10 may reside in a single network or within multiple networks. Although described with respect to routers, aspects of the techniques are applicable to other network devices, such as bridges, switches, gateways, network caches, and network acceleration devices.

In the example of FIG. 1, network system 2 includes a number of source devices 12 and a destination device 14 coupled to an intermediate network 6. Each of source devices 12 and destination device 14 may be a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, or another type of device capable of interfacing with and communicating over network 6.

Source devices 12 and destination device 14 connect to network 6 via access links 5 that may comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), or wired Ethernet.

A number of physical and virtual communication links of network 6 interconnect routers 10 to facilitate control and data communication between the routers. Physical links of network 6 may include, for example, Ethernet PHY, Synchronous Optical Networking (SONET)/Synchronous Digital Hierarchy (SDH), Lambda, or other Layer 2 data links that include packet transport capability. Logical links of network 6 may include, for example, an Ethernet Virtual LAN, an MPLS LSP, or an MPLS-TE LSP.

Routers 10 employ one or more interior gateway protocols (IGPs) to learn link states/metrics for communication links within the interior of network 6. For example, router 10A may use an Open Shortest Path First (OSPF) or Intermediate System-Intermediate System (IS-IS) protocol to exchange routing information with routers 10B-10E. Router 10A stores the routing information to a routing information base that the router uses to compute optimal routes to destination addresses advertised within network 6.

In some instances, routers 10 support traffic engineering to improve the utilization of paths through network 6. In general, traffic engineering refers to operations to move traffic flow away from the shortest path computed by an interior gateway protocol for network 6 and toward a potentially less congested or otherwise more desirable (from an operational point of view) physical path across the network. For example, a network 6 administrator or routers 10 may establish, using Resource Reservation Protocol with Traffic Engineering extensions (RSVP-TE) or another label distribution protocol (e.g., the Label Distribution Protocol (LDP)), one or more LSP tunnels that connect various pairs of routers 10 to route network traffic away from network failures, congestion, and bottlenecks. A router that comprises an interface to the LSP tunnel associates a metric with the LSP. An LSP metric may assume the metric of the underlying IP path over which the LSP operates or may be configured by an administrator of network 6 to a different value to influence routing decisions by routers 10. Routers 10 execute the interior gateway protocols to communicate via routing protocol messages and exchange metrics established for the LSP tunnels and store these metrics in a respective routing information base for use in computing optimal routes to destination addresses advertised within network 6. For example, routers 10 may advertise LSP tunnels as IGP links of network 6 using OSPF forwarding adjacencies (FAs). As used herein, therefore, the term "link" or "communication link" may also refer to an LSP operating over a layer 2 communication link.

RSVP-TE-established LSPs reserve resources using path state on routers 10 to ensure that such resources are available to facilitate a class of service (CoS) for network traffic forwarded using the LSPs. For example, router 10A may issue RSVP Path messages toward router 10D to establish an LSP and to reserve an amount of bandwidth for the LSP using path state on both router 10A and router 10B. Routers 10A, 10B must maintain the reserved amount of bandwidth for network traffic mapped to the LSP until the LSP is either preempted or torn down. RSVP-TE is described more fully in Awduche et al., "RSVP-TE: Extensions to RSVP for LSP Tunnels," Request for Comments 3209, Network Working Group, Internet Engineering Task Force, December, 2001, which is incorporated by reference as if fully set forth herein.

As described herein, routers 10 may additionally distribute detailed knowledge about network loading using extensions to the IGPs. For example, routers 10 may execute IS-IS with traffic engineering extensions described herein that use new type-length values (TLVs). As another example, routers 10 may execute OSPF with traffic engineering extensions using opaque link-state advertisements (LSAs) to distribute link attributes in link-state advertisements in addition to link-state and metrics. In some examples, routers 10 may advertise currently available bandwidth for the links of network 6, which takes into account traffic for which may otherwise be unaccounted. That is, routers 10 monitor and advertise currently available bandwidth for a link, expressed as a rate (e.g., MB/s), that takes into account bandwidth that is neither reserved via RSVP-TE nor currently in use to transport Internet Protocol (IP) packets or LDP packets over the link, where an LDP packet is a packet having an attached label distributed by LDP. Currently available bandwidth for a link is therefore neither reserved nor being used to transport traffic using unreserved resources.

Routers 10 measure the amount of bandwidth in use to transport IP and LDP packets over outbound links and compute currently available bandwidth as a difference between the link capacity and the sum of reserved bandwidth and measured IP/LDP packet bandwidth. Routers 10 exchange computed available bandwidth information for their respective outbound links as link attributes in extended link-state advertisements of a link-state interior gateway protocol and store received link attributes to a respective Traffic Engineering Database (TED) that is distinct from the generalized routing information base (including, e.g., the IGP link-state database).

Router 10A executes a shortest-path first (SPF) algorithm over its routing information base to compute optimal forwarding paths through network 6 to router 10D by which destination device 14 is reachable. In some instances, router 10A may execute a constrained SPF (CSPF) algorithm over its routing information base and its traffic engineering database to compute paths for LSPs subject to various constraints, such as link attribute requirements, input to the CSPF algorithm. For example, router 10A may execute a CSPF algorithm subject to a bandwidth constraint that requires each link of a computed path from router 10A to router 10D to have at least a specified amount of bandwidth currently unreserved by RSVP-TE.

In the illustrated example of FIG. 1, router 10A computes a SPF or CSPF algorithm over its routing information and/or TED that results in multiple shortest paths 16A-16B ("paths 16") through network 6 having equal costs. That is, a routing cost from router 10A to router 10D is equivalent between path 16A traversing routers 10A-10B-10D and path 16B traversing routers 10A-10C-10E-10D. Paths 16 may each represent an LSP or IP path, for example.

Having determined that paths 16 have equal costs to router 10D, router 10A can form an equal-cost multipath (ECMP) set composed of both paths 16. In one example technique, router 10A additionally computes a weight for each of paths 16 based on the current minimum available bandwidth along the respective path. That is, router 10A accesses its TED and determines a minimum available bandwidth currently available for the respective set of links along each of paths 16, then computes a weight for the respective one of paths based on the determined minimum available bandwidth in accordance with a weight function. For example, router 10A may determine a minimum available bandwidth for path 16A by first reading the TED to determine an available bandwidth for the router 10A-router 10B link and the router 10B-router 10D link and then comparing the available bandwidths to find the lowest available bandwidth value for path 16A. The lowest available bandwidth value of the various links of a path may then be used as the minimum available bandwidth for path 16A. In one example, the weight router 10A computes a relatively higher weight for one of paths 16 when the path has a relatively higher minimum available bandwidth.

Router 10A receives network traffic, sourced by source devices 12 and destined for destination device 14, classified to one of packet flows 22A-22D ("packet flows 22"). Router 10A assigns each of packet flows 22 to one of paths 16 that constitute the ECMP set to router 10D based on the respective computed weights for paths 16. In general, the higher the weight value, the greater the relative proportion of network traffic that router 10A assigns to the path due to the computed weight. In the illustrated example, path 16A has a higher relative minimum available bandwidth that path 16B, and router 10A accordingly computes a higher weight for path 16A than for path 16B. Upon identifying each of packet flows 22, moreover, router 10A assigns the respective packet flows 22 to paths 16 according to the computed weights for the paths. Because router 10A associates a higher weight value to path 16A, router 10A assigns a plurality of the packet flows (i.e., packet flows 22A, 22B, and 22C in this example) to path 16A, while assigning few packet flows (only packet flow 22D) to path 16B. The described techniques may be performed continually to foster dynamic load balancing of packet flows over time that changes responsive to available bandwidth conditions of the underlying links of path in the ECMP set.

This may improve load balancing within network 6 to cause a concomitant reduction in congestion and improved network performance. Assuming, for example, that each of packets flows 22 have similar profiles with respect to the size and rate of packets classified to the packet flows, assigning packet flows 22 based on the minimum available bandwidth along each of paths 16 rather than based on round-robin techniques may provide for more equitable load balancing among paths 16, for router 10A assigns more flows to path 16A having relatively higher minimum available bandwidth than path 16B. This causes path 16A to carry a larger amount of the traffic for flows 22 relative to path 16B and thereby reduces a load on path 16B relative to equal flow distribution techniques.

Figure 2:
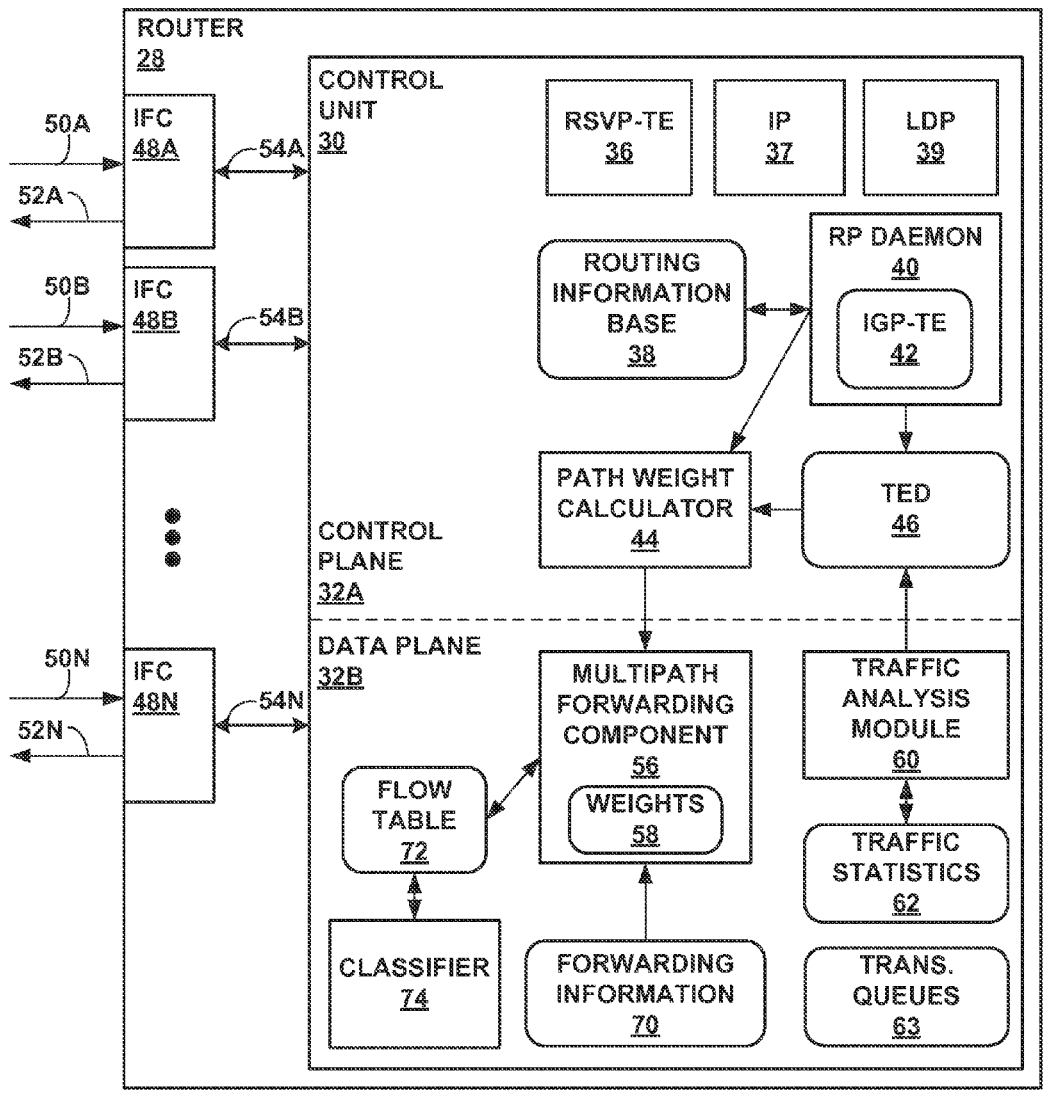
FIG. 2 is a block diagram illustrating an example router that performs the bandwidth availability determinations and weighted ECMP flow-assignment techniques described in this disclosure.

FIG. 2 is a block diagram illustrating an example router 28 that performs the bandwidth availability determinations and weighted ECMP flow-assignment techniques described in this disclosure. Router 28 may represent an example embodiment of any of routers 10 of FIG. 1, and/or of routers 210, source router 212, or destination router 214 of FIG. 7.

Router 28 includes a control unit 30 and interface cards 48A-48N ("IFCs 48") coupled to control unit 30 via internal links 54A-54N. Control unit 30 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Further, while described with respect to a particular network device, e.g., a router, the techniques of this disclosure are applicable to other types of network devices such as switches, content servers, bridges, multi-chassis routers, or other device capable of performing the described techniques.

In this example, control unit 30 is divided into two logical or physical "planes" to include a first control or routing plane 32A and a second data or forwarding plane 32B. That is, control unit 30 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 32A of control unit 30 executes the routing functionality of router 28. In this respect, control plane 32A represents hardware or a combination of hardware and software of control unit 30 that implements routing protocols (not shown in FIG. 2) by which routing information stored in routing information base 38 ("RIB 38") may be determined. RIB 38 may include information defining a topology of a network, such as network 6 of FIG. 1, learned by execution by routing protocol daemon 40 ("illustrated as RP daemon 40") of Interior Gateway Protocol with Traffic Engineering extensions 42 ("IGP-TE 42"). For example, RIB 38 may include a link-state database of physical and logical links (e.g., LSPs advertised as forwarding adjacencies). RIB 38 also includes a forwarding database that stores routes calculated by RP daemon 40 for various destinations. IGP-TE 42 may represent an embodiment of any interior routing protocol that announces and receives link attributes for links of the network. For example, IGP-TE 42 may represent OSPF-TE or IS-IS-TE. RIB 38 may also include an MPLS routing table that stores MPLS path and label information for LSPs through the network. In such instances, IGP-TE 42 advertises LSPs and associated metrics as forwarding adjacencies to other instances of IGP-TE executing on additional routers of the network.

RP daemon 40 (e.g., routing protocol software executing on control unit 30 of router 28) may resolve the topology defined by routing information in RIB 38 to select or determine one or more active routes through the network to various destinations. Control plane 32A may then update data plane 32B with these routes, where data plane 32B maintains these routes as forwarding information 70 that maps network destinations to one or more outbound interfaces 52. Forwarding or data plane 32B represents hardware or a combination of hardware and software of control unit 30 that forwards network traffic received by interface cards 48 via inbound links 50A-50N over outbound links 52A-52N of interface cards 48 in accordance with forwarding information 70 and/or flow table 72. For example, aspects of data plane 32B may be implemented within router 28 as one or more packet forwarding engines ("PFEs") each associated with a different one of IFCs 48 and interconnected to one another via a switch fabric.

Control plane 32A also includes RSVP-TE 36, IP 37, and LDP 39. IP 37 is used by router 28 to support IP-based forwarding that does not use MPLS labels or LSPs. LDP 39 is a signaling protocol that is used for distributing labels associated with LSPs in a network.

RSVP-TE 36 of control plane 32A is a signaling protocol that can be used to establish explicitly routed LSPs over a network. RSVP-TE 36 may receive an explicit routing path from an administrator, for example, for a new LSP tunnel as well as a configured metric for the LSP tunnel. RSVP-TE 36 requests downstream routers to bind labels to a specified LSP tunnel set up by router 28 and may direct downstream routers of the LSP tunnel to reserve bandwidth for the operation of the LSP tunnel. In addition, RSVP-TE 36 installs MPLS forwarding state to forwarding information 70 to reserve bandwidth for one of outbound links 52 of IFCs 48 for the LSP tunnels and, once the LSP is established, to map a label for the LSP to network traffic, which is then forwarded by data plane 32B in accordance with the MPLS forwarding state for the LSP. The set of packets assigned by router 28 to the same label value for an LSP tunnel belong to a particular forwarding equivalence class (FEC) and define an RSVP flow.

Traffic analysis module 60 of data plane 32B can monitor traffic through data plane 32B (e.g., LDP or IP traffic) that is not associated with reserved bandwidth, and generate traffic statistics 62. Traffic analysis module 60 may, for example, monitor the amount of LDP traffic being output on each of outbound links 52. In some embodiments, traffic analysis module 60 may control the granularity of traffic statistics 36. For example, in one embodiment, traffic analysis module 60 may only monitor and generate statistics for a total amount of LDP traffic being output from router 28 on each one of outbound links 52. In other embodiments, traffic analysis module 60 may, however, generate more granular traffic statistics by monitoring the different types of traffic. For example, traffic analysis module 60 may track the amount of LDP traffic output on each of outbound links 52 as well as the amount of IP traffic output on each of outbound links 52. Aspects of traffic analysis module 60 may be distributed to control plane 32A in various instances of router 28.

In accordance aspects of this disclosure, traffic analysis module 60 calculates the amount of bandwidth available on one or more outbound links 52 associated with router 28. Traffic analysis module 60 calculates the available bandwidth using the statistics stored in traffic statistics 36, i.e., statistics for current consumption of non-reserved bandwidth, as well as the reservation requests stored in forwarding information 70. In this manner, traffic analysis module 60 accounts for both the amount of bandwidth reserved for RSVP-TE traffic and the amount of LDP or other traffic currently using bandwidth of outbound links 52. As a result, traffic analysis module 60 may generate bandwidth availability information for each of outbound links 52. For each of outbound links 52, traffic analysis module 60 may, for example, calculate the available bandwidth information by averaging the amount of LDP traffic over time, and subtracting the average LDP traffic and the amount of reserved bandwidth from a total capacity associated with each of the links. Alternatively, or in addition, the techniques may be used to account for IP traffic or other traffic output on outbound links 52 that is not associated with reserved resources. For example, for each of outbound links 52, traffic analysis module 60 may monitor the IP traffic, and traffic analysis module 60 calculates an average amount of IP traffic over a configurable period. Traffic analysis module 60 calculates the available bandwidth by taking the capacity of the link minus the monitored traffic statistics minus the RSVP reservations. Traffic analysis module 60 stores the calculated bandwidth availability information to traffic engineering database ("TED 46").

Traffic analysis module 60 may monitor traffic by monitoring transmission queues 63 (illustrated as "trans. queues 63") for outbound interfaces to outbound links 52. After data plane 32B sends a packet to an outbound interface, the one of interface cards 48 that includes the outbound link 52 associated with the outbound interface queues the packet for transmission on one of transmission queues 63. Many different transmission queues 63 representing different classes of service may be mapped to each of outbound links 52, and the amount of time that a packet remains in a queue strongly correlates to the amount of available bandwidth of the corresponding link. Each physical or logical link (e.g., an LSP) is associated within forwarding information 70 with one of the transmission queues 63 for the outbound interface for the link. RSVP-TE 28 reserves for a reservation-oriented forwarding class some proportion of the bandwidth for the outbound link by installing reservation state in forwarding information 70. In effect, this associates RSVP LSPs with one of transmission queue 63 that has assured (i.e., reserved) bandwidth.

Traffic analysis module 60 may periodically monitor available bandwidth for outbound links by monitoring the transmission queues 63 for classes of service that have no assured bandwidth. Traffic analysis module 60 may, for instance, periodically determine the queue sizes for non-bandwidth-assured ones of transmission queues 63 and apply a function to the queue sizes that returns an amount of available bandwidth for the link based on the queue sizes. As another example, traffic analysis module 60 may periodically set a timer to first measure the length of time between enqueuing and dequeuing a particular packet for transmission and then apply a function to that returns an amount of available bandwidth for the link based on the measured length. The function may include link capacity and reserved bandwidth parameters to compute available bandwidth as a difference between link capacity and a sum of reserved bandwidth and IP/LDP bandwidth presently in use.

In some examples, traffic analysis module 60 copies the determined available bandwidth to TED 46. In some instances, traffic analysis module 60 stores a time-series of periodically determined available bandwidths for each of outbound links 52 to traffic statistics 62 and applies a smoothing function, such as a moving average filter, weighted moving average filter, or exponentially weighted moving average filter, to the set of time-series to attenuate traffic bursts over the outbound links. When traffic analysis module 60, for any one of outbound interfaces 52, determines the moving average exceeds a threshold increase or threshold decrease from an available bandwidth value previously copied to TED 46, traffic analysis module 60 copies the moving average as the new available bandwidth value for the corresponding link to TED 46. Copying of the new available bandwidth value, by traffic analysis module 60 to TED 46, may trigger an IGP advertisement by IGP-TE 42 of available bandwidth for the link. In some instances, IGP-TE 42 reads traffic statistics 62 to determine available bandwidth for a link.

As mentioned above, IGP-TE 42 can advertise the calculated bandwidth availability information of TED 46 to other routing devices as a minimum bandwidth link attribute for corresponding links. In addition, IGP-TE 42 receives bandwidth availability information from the other routing devices for other links in the network and updates TED 46 with the received bandwidth availability information. In this manner, router 28 maintains accurate bandwidth availability information for links for an entire network, e.g., network 6 of FIG. 1.

In instances of network 2 that provide Differentiated Services, or "DiffServ TE," RSVP-TE may reserve resources according to a number of traffic classes. Differentiated Services in the context of traffic engineering is described in Minei et al., "Extensions for Differentiated Services-aware Traffic Engineered LSPs," Internet Draft, Network Working Group, Internet Engineering Task Force, June, 2006, which is incorporated by reference as if fully set forth herein. In such instances, traffic analysis module 60 determines available bandwidth for each traffic class linked to DiffServ code points in the data plane, and IGP-TE 42 advertises each of the available bandwidths for the traffic classes to other instances of IGP-TE executing in other routers. As described in further detail below, classifier 74 and multipath forwarding component 56 then operate using class-based available bandwidths when load balancing network traffic for the classes.

Router 28 employs equal-cost multipath (ECMP) routing techniques to distribute network traffic load over multiple equal-cost paths through the network. RP daemon 40 executes an SPF algorithm over a link-state database of RIB 38 (or a CSPF algorithm over TED 46 in addition to the link-state database of RIB 38) to identify multiple equal-cost paths to the same destination. RP daemon 40 forms an ECMP set composed of the equal-cost paths and derives one or more forwarding structures from the calculated paths to maintain the equal-cost paths in the form of multiple possible next-hops to the same destination. RP 40 daemon then installs these forwarding structures to forwarding information 70, and data plane 32B may use any available forwarding structures derived from the ECMP set in forwarding network traffic flows toward the destination. As explained above, however, in some examples, a set of multiple paths may be selected that are not necessarily equal-cost paths. RP daemon 40 may select a set of acceptable non-looping paths, where the selection may be done based on other constraint(s).

Upon identifying an ECMP set, RP daemon 40 additionally prompts path weight calculator 44 of control plane 32A to compute a weight for each path in the ECMP set according to a minimum available bandwidth for the path, or according to an amount of bandwidth for the outgoing interfaces as described in examples below. Path weight calculator 44 determines the network links that constitute each path in the ECMP and, for each link in the path, reads TED 46 to identify an available bandwidth for the link. To determine a minimum available bandwidth for the path, path weight calculator 44 identifies the minimum available bandwidth value for all of the links that constitutes the path.

Based on the minimum available bandwidth values or path bandwidth values determined for the various paths in the ECMP set, path weight calculator then determines a relative weight to be applied by multipath forwarding component 56 for each path. For example, path weight calculator 44 may set relative weights for each path in an ECMP set according to ratios of minimum available bandwidths or path bandwidth for each path to the smallest minimum available bandwidth of any path in the ECMP set. For instance, if path A of an ECMP set has a minimum available bandwidth of 10 MB/s, path B of the ECMP set has a minimum available bandwidth of 50 MB/s, and path C of the ECMP set has a minimum available bandwidth of 25 MB/s, the path weight calculator 44 may compute the weights for paths A, B, C to 2, 10, and 5, respectively, to reflect the minimum available bandwidth ratios for the ECMP set. Path weight calculator 44 may in other examples use other formulas for computing weights for the paths in an ECMP set. Path weight calculator 44 installs computed weights for an ECMP set to weights 58 of multipath forwarding component 56.

In some aspects, classifier 74 identifies new packet flows and classifies inbound packets received on inbound links 50 to packet flows referenced by flow table 72. A "packet flow," as used herein, refers a set of packet header field values and/or packet data that cause any packet containing such values to be assigned to a particular path in an ECMP set toward that packet's destination. In addition, a packet flow is the minimum granularity at which router 28 maintains state in flow table 72 for forwarding network packets that are classified to a packet flow referenced in flow table 72. Classifier 74 may classify packets to a packet flow referenced in flow table 72 by, for example, their respective <source IP address, destination IP address, protocol identifier>3-tuple value or by their respective <source IP address, destination IP address, source port, destination port, protocol identifier>5-tuple value.

Flow table 72 comprises a data structure, e.g., a table, for storing information or data in packet flow entries each pertaining to a different packet flow traversing router 28. Such data includes in some instances a reference to a next-hop structure in forwarding information 70 that specifies a path in an ECMP set. Although illustrated and described as a table, the data in flow table 72 may be stored to any other data structure, such as a graph, a linked-list, etc. Flow table 72 stores data describing each flow previously identified by classifier 74, e.g., the five-tuple and other information pertinent to each flow. That is, flow table 72 may specify network elements associated with each active packet flow, e.g., source and destination devices and ports associated with the packet flow. Flow table 72 may also include a unique application identifier (ID) for each flow that uniquely identifies the application to which each flow corresponds.

When classifier 74 identifies a new flow, multipath forwarding component 56 may determine that forwarding information 70 includes multiple possible next-hops to the destination for the flow. In other words, multipath forwarding component 56 determines there is an available ECMP set for the flow. Multipath forwarding component 56 therefore applies respective weights 58 for the next-hops of the ECMP set and assigns the new flow to one of the next-hops according to the weights. Multipath forwarding component 56 may apply an algorithm that is parameterized according to the weights 58 of the ECMP set for the new flow destination and use the result of the function to select one of the possible next-hops for flow assignation. For example, in some instances, multipath forwarding component 56 applies a weighted round-robin algorithm that is weighted according to the weights 58 of the ECMP set to select one of the possible next-hops for new packet flows destined for a destination served by the ECMP set. As another example, in some instances, multipath forwarding component 56 applies weighted hashed mode techniques to, first, increase the number of hash buckets for paths in the ECMP set according to weights 58 for the paths and then hash, e.g., the source/destination addresses of the new flow to select a hash bucket and an associated path in the ECMP set for the new flow.

To associate the new flow with the selected next-hop, multipath forwarding component 56 adds a reference (e.g., a pointer that resolves to a next-hop or an index) to the selected next-hop in the forwarding information 70 in the flow table 72 entry generated by classifier 74 for the new flow. The reference to the selected next-hop in the flow table 72 entry for the new flow causes multipath forwarding component of data plane 32B to forward packets of the new flow to the selected next-hop. As a result, router 28 assigns packet flows and balances network traffic loads according to a minimum available bandwidth for various paths of an ECMP set that serves destinations for the packet flows.

Figure 3:
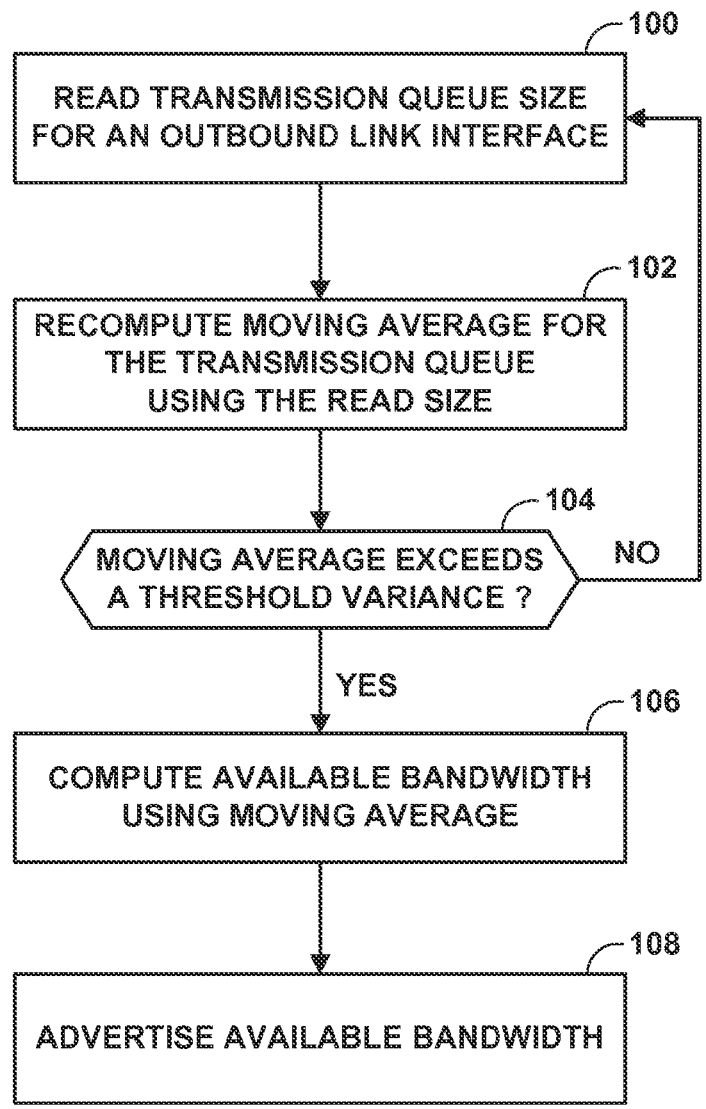
FIG. 3 is a flowchart illustrating an example operation of the example router of FIG. 2 to advertise available bandwidth for neighboring links by analyzing interface transmission queue characteristics in accordance with the techniques described in this disclosure.

FIG. 3 is a flow chart illustrating an example operation of router 28 of FIG. 2 to advertise available bandwidth for neighboring links by analyzing interface transmission queue characteristics in accordance with techniques described in this disclosure. To determine bandwidth in use by non-reserved (e.g., IP and LDP) traffic, traffic analysis module 60 reads a size of a transmission queue (i.e., the number of packets queued for transmission) for an interface for one of outbound links 52 (100). Traffic analysis module 60 stores the read size value to traffic statistics 62 and recomputes a moving average of the transmission queue size using the additional data point, i.e., the read size (102). If the moving average exceeds a threshold variance (e.g., 5% or an absolute value variance) from a previous moving average value used by traffic analysis module 60 as a basis for updating an available bandwidth value for the link (YES branch of 104), then traffic analysis module 60 computes the available bandwidth for the link using the moving average (106), where the available bandwidth on the link is inversely correlated to the moving average of the size of the transmission queue for the link. Traffic analysis module may, for example, compute available bandwidth for a physical or logical link as a difference between the link capacity and the sum of reserved bandwidth and measured IP/LDP packet bandwidth. Traffic analysis module 60 stores the available bandwidth to TED 46 for advertisement by IGP-TE 42 to other instances of the routing process in other routers.

Figure 4:
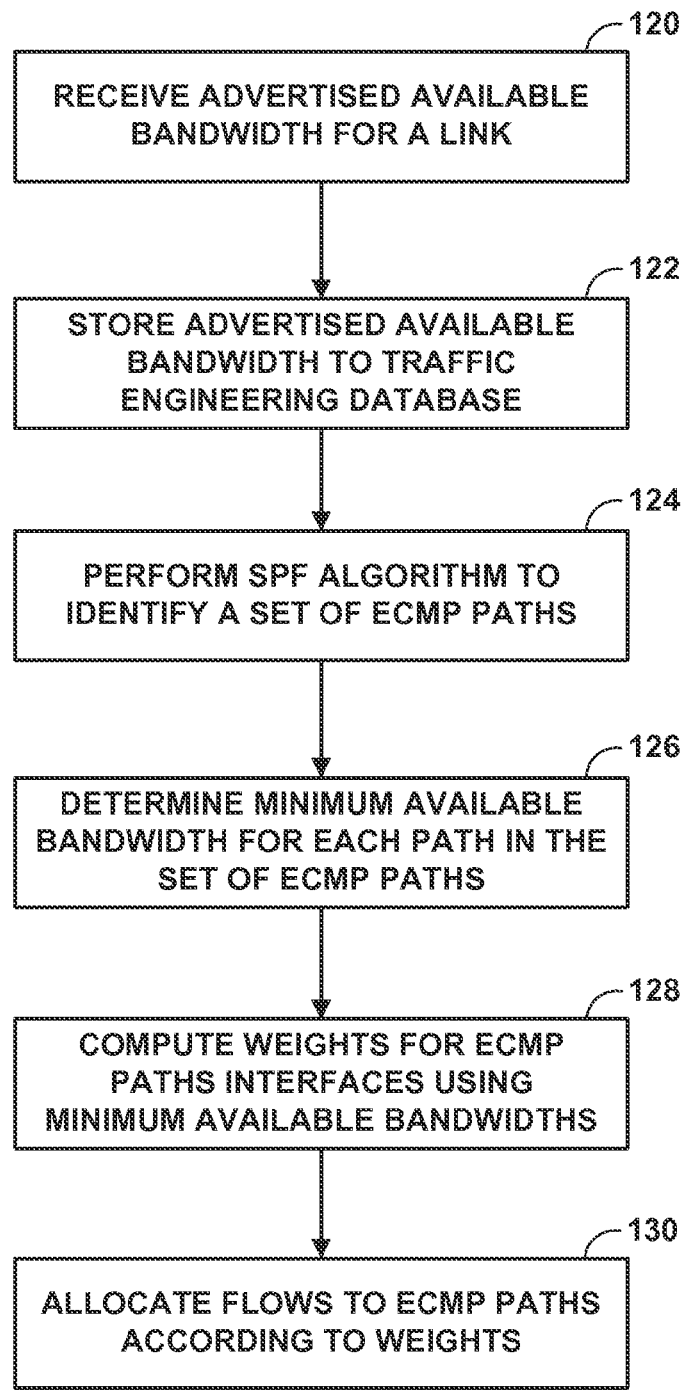
FIG. 4 is a flowchart illustrating an example operation of the example router of FIG. 2 to compute respective weights for paths of an ECMP set and to allocate flows to paths of the ECMP in accordance with the weights in the manner described herein.

FIG. 4 is a flowchart illustrating an example operation of router 28 of FIG. 2 to compute respective weights for paths of an ECMP set and to allocate flows to paths of the ECMP in accordance with the weights in accordance with one example embodiment described herein. In the example of FIG. 4, RP daemon 40 executes IGP-TE 42 to receive advertisements formed in accordance with traffic engineering extensions to include available, unreserved bandwidth for advertised links (120). IGP-TE 42 stores advertised available bandwidth values for advertised links in TED 46 (122).

RP daemon 40 executes a shortest-path first algorithm over link-state information in RIB 38 to compute optimal (according to IGP metrics in RIB 38) forwarding paths from router 28 to various destinations. In some cases, RP daemon 40 identifies multiple optimal, equal-cost forwarding paths to a particular destination or set of destinations and, in such cases, creates an ECMP set composed of the multiple equal-cost forwarding paths (124).

Path weight calculator 44 analyzes respective links that constitute the various forwarding paths in the ECMP to determine minimum available bandwidths for the paths (126). For example, path weight calculator 44 reads available bandwidth values for each link in a path and determines the minimum available bandwidth value among all such values for the various links. This minimum available bandwidth value is the minimum available bandwidth for the corresponding path. Path weight calculator 44 uses the minimum available bandwidth determined for each of the paths in the ECMP set to compute relative weights for the paths and stores these weights to weights 58 (128). A relatively higher computed weight indicates a greater amount of minimum available bandwidth for a path in the ECMP set vis-á-vis the other paths. Multipath forwarding component 56 allocates new packet flows destined for destinations served by the ECMP set and identified by the classifier 74 to paths in the ECMP set in accordance with respective weights 58 for the paths (130).

Figure 5:
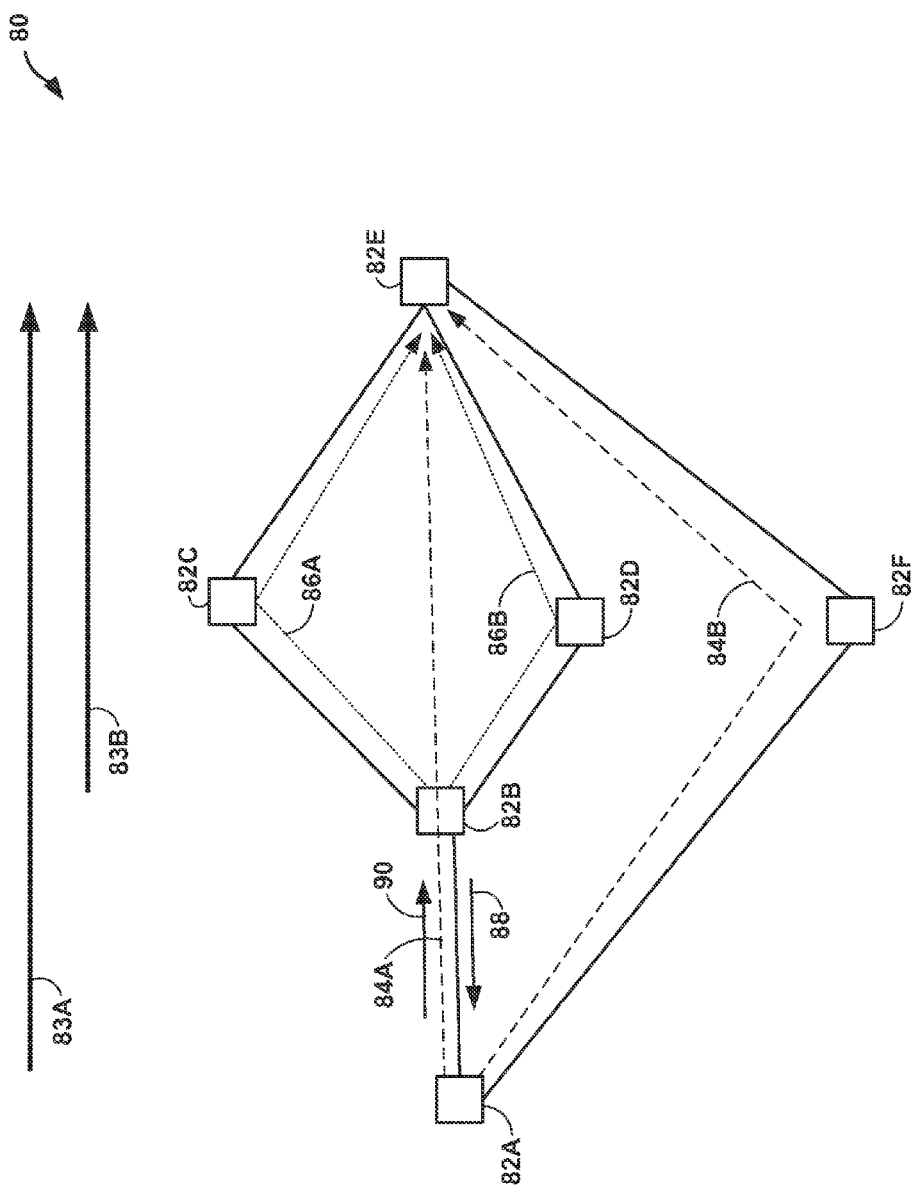
FIG. 5 is a block diagram illustrating an example network system having routers that perform weighted ECMP techniques using composite links.

FIG. 5 is a block diagram illustrating an example network system 80 having routers 82A-82F that perform weighted ECMP techniques using composite links. A composite link bundles multiple parallel component links between two routers of an MPLS network together as a single logical network link. Component links may be non-homogeneous within a composite link and so may have varying IGP or TE metrics, such as cost and capacity. An ingress router for the composite link may advertise the link to other routers of the network in a link state advertisement of an IGP. Component links of a composite link may be a set of equal-cost multipaths from the ingress router for the composite link to the egress router of the composite link. Consequently, weighted ECMP techniques described herein may improve network load balancing over component links of a composite link and so improve overall performance of the composite link.

The illustrated network system 80 provides two examples of composite links Composite link 83A from router 82B to router 82E includes component links 86B, 86C that are each LSPs from router 82B to router 82E. Composite link 83B from router 82A to router 82E includes component links 84A, 84B that are each LSPs from router 82A to router 82E. Composite link 83A includes composite link 83B as a transport link of component link 84A, thus illustrating the possibility of recursion among composite and component links.

Routers 82 use the techniques of this disclosure to advertise available bandwidth for composite links 83A-83B ("composite links 83") as a function of the minimum available bandwidth of respective components links of the composite links. Router 82B determines minimum available bandwidths of each of component links 86A, 86B for composite link 83B using techniques described herein. For example, router 82B may determine minimum available bandwidths of each of component links 86A, 86B by receiving available bandwidth advertisements from routers 82C, 82D for the router 82C-82E link and the router 82D-82E link, respectively. Router 82B may independently determine available bandwidths over the router 82B-82C link and the router 82B-82D link by, for instance, analyzing the respective transmission queues for the links. In one example, router 82B computes an available bandwidth for composite link 83B as a sum of the minimum available bandwidths for component links 86A, 86B and advertises, in IGP-TE advertisement 88 to router 82A, the available bandwidth as a link attribute for composite link 83B. To router 82A that receives IGP-TE advertisement 88, composite link 83B appears to be a single link in a component link 84A towards router 82E and may be used by router 82A in a shortest-path first determination.

Router 82A may then use the advertised available bandwidth for composite link 83B, received in IGP-TE advertisement 88, when performing WECMP techniques to load balance network traffic over component links 84A, 84B of composite link 83A. For example, the available bandwidth for composite link 83B may represent the minimum available bandwidth of any sub-link of component link 84A of composite link 83A. As a result, router 82A may compute a relative weight for component link 84A using the available bandwidth for composite link 83B and load balance network traffic between the component links 84A, 84B of composite link 83A according to the computed, relative weight using techniques described herein.

The composition of component links 83 may change due to addition or deletion of respective component links therein. In such circumstances, routers 82 can recompute and advertise available bandwidths for modified composite links 83 using the new respective set of component links for the composite link.

A network service provider or other administrator 80 may establish an RSVP-TE signaled LSP from router 82A to router 82E that traverses router 82B toward router 82E via composite link 83B. Router 82B and router 82E, as an aspect of RSVP-TE signaling, assign the LSP to both component links 86A, 86B of composite link 83B. In other words, the label associated with the LSP from router 82B to router 82E is valid on both component links 86A, 86B for tunneling over the component links from router 82B to router 82E. Because the label for the RSVP-TE signaled LSP identifies a forwarding equivalence class at router 82B, each separate network packet flow carried by the LSP may be load-balanced by router 82B over component links 86A, 86B using the weighted ECMP techniques described in this disclosure, where component link 83B effectively represents an ECMP set. In some instances, component link 86A may have different traffic characteristics unable to support the resource requirements of the RSVP-TE signaled LSP. In such instances, component link 86A is excluded from the ECMP set when load balancing over component links of composite link 83B.

Furthermore, because the RSVP-TE signaled LSP from router 82 to router 82E may be assigned to both component links 86A, 86B of composite link 83B, router 82B performs call admission control (CAC) for a PATH resource reservation request using the available bandwidth for the composite link 83B. Router 82B may use weighted ECMP techniques to allocate differently apportioned resources for respective outbound interfaces of component links 86A, 86B responsive to a PATH resource reservation request. For example, router 82B responsive to a request for 40 MB/s bandwidth over composite link 83B may reserve 30 MB/s from an outbound interface for component link 86A while reserving 10 MB/s from an outbound interface for component link 86B, in accordance with respective weights computed using minimum available bandwidths for component links 86. Router 82B ensures the bandwidth reserved responsive to a particular request is less than the available bandwidth for a particular one of component links 86.

Router 82B may dynamically reassign an RSVP-TE signaled LSP from component link 82A to component link 82B due to dynamic application by router 82B of the weighted ECMP techniques described above. Router 82B applies make-before-break (MBB) techniques described in Awduche et al., referenced above, and LSP stitching to apply a single hop stitch from component link 82A to component link 82B. LSP stitching is described more fully in Ayyangar et al., "Label Switched Path Stitching with Generalized Multiprotocol Label Switching Traffic Engineering (GMPLS TE)," Network Working Group, Request for Comments 5150, February 2008, which is incorporated herein by reference in its entirety. Router 82B may also reduce the bandwidth reserved for an RSVP-TE signaled LSP assigned to composite link 83B when router 82B detects congestion over component links 86A and/or component links 86B. In this way, router 82B may avoid total preemption of the LSP in favor of partial preemption, which is described more fully in Polk et al., "A Resource Reservation Protocol (RSVP) Extension for the Reduction of Bandwidth of a Reservation Flow," Network Working Group, Request for Comments 4495, May 2006, which is incorporated herein by reference in its entirety.

Figure 6:
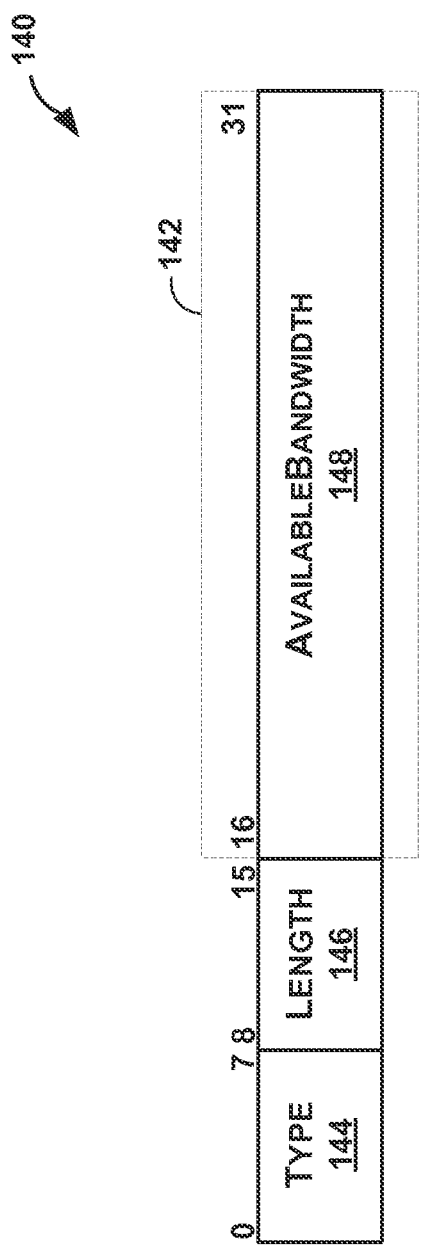
FIG. 6 is a block diagram illustrating an example encoding of the available bandwidth information described herein for a routing protocol.

FIG. 6 is a block diagram illustrating an example encoding of the available bandwidth information described herein for the IS-IS routing protocol. In general, an IS-IS link state PDU is composed of a fixed header and a number of tuples, each consisting of a Type, a Length, and a Value (TLV). Generally, routers 10 of FIG. 1 use flooding-based routing protocols to announce topology information to each other and synchronize link-state databases maintained by each of the routers. As described herein, routers 10 support an enhanced interior gateway protocol that has been extended in the manner described herein by which routers 10 may advertise available bandwidth information determined by the routers for neighboring links.

In the illustrated example, a new, opaque Type, Length, Value (TLV) 140 is defined that can be carried by various types of link state messages that are already used within network system 2 of FIG. 1. TLV 140 includes a TYPE field 144, a LENGTH field 146, and a VALUE field 142 that includes AVAILABLEBANDWIDTH field 148.

TYPE field 144 has a length of one octet that specifies a unique identifier for the new TLV defined herein for carrying the burst rate and average rate control information for the flooding-based routing protocol. LENGTH field 146 is one octet in length and indicates the length of the VALUE field 142 in octets, i.e., 4 in this example TLV.

AVAILABLEBANDWIDTH field 148 carried by VALUE field 142 specifies a rate of available bandwidth for a link associated with TLV 140. AVAILABLEBANDWIDTH field 148 has a four-octet value that carries a single-precision floating point value to store the rate of available bandwidth in, e.g., kilobytes/sec. TLV 140 may be associated with a link by inclusion in an IS-IS message that provides link-state for the link. IS-IS allows the inclusion of TLVs in any kind of IS-IS message and the protocol specification requires that unrecognized TLVs are to be ignored by the routers. In this manner, TLV 140 is referred to herein as an opaque TLV and the techniques described herein allow for routers 10 to extract and record the current available bandwidth for the associated link.

TLV 140 may be carried by a variety of different types of link state messages used within network system 2. For example, routers 10 typically exchange initial link state messages to establish the adjacency relationship. For example, routers 10 may exchange IS-IS HELLO protocol data units (PDUs) to establish adjacencies with other routers. Routers 10 may include TLV 140 described herein within these initial PDUs so as to inform the other routers as to the available bandwidth on neighboring links. In addition, or alternatively, routers 10 opaquely include TLV 140 within the flooding-based link state messages to synchronize traffic engineering databases maintained by each of the routers. Each link state message is typically refreshed periodically on the network and is acknowledged by the receiving routers. For example, routers 10 may utilize periodic IS-IS link state PDUs for synchronizing their link-state databases and utilize partial sequence number PDUs (PSNPs) and complete sequence number PDUs (CSNPs) to acknowledge receipt of the information. Routers 10 may embed TLV 140 within the link state PDUs, or, more likely, within the acknowledgement PDUs.

As another example, routers 10 may exchange opaque OSPF link-state advertisements (LSAs), such as traffic engineering LSAs, that carry TLV 140. Traffic engineering LSAs are described in RFC 3630, "Traffic Engineering (TE) Extensions to OSPF Version 2," Network Working Group, September 2003, which is incorporated by reference herein. In a traffic engineering LSA, a link TLV describes a single link and includes a set of sub-TLVs. TLV 140 may be defined as a new sub-TLV type for a link TLV that specifies currently available bandwidth for the described link that is neither reserved nor currently in use to transport Internet Protocol (IP) packets or LDP packets over the link. In this manner, routers 10 exchange available bandwidths for network 6 links to enable the weighted ECMP techniques described herein.

Figure 7:
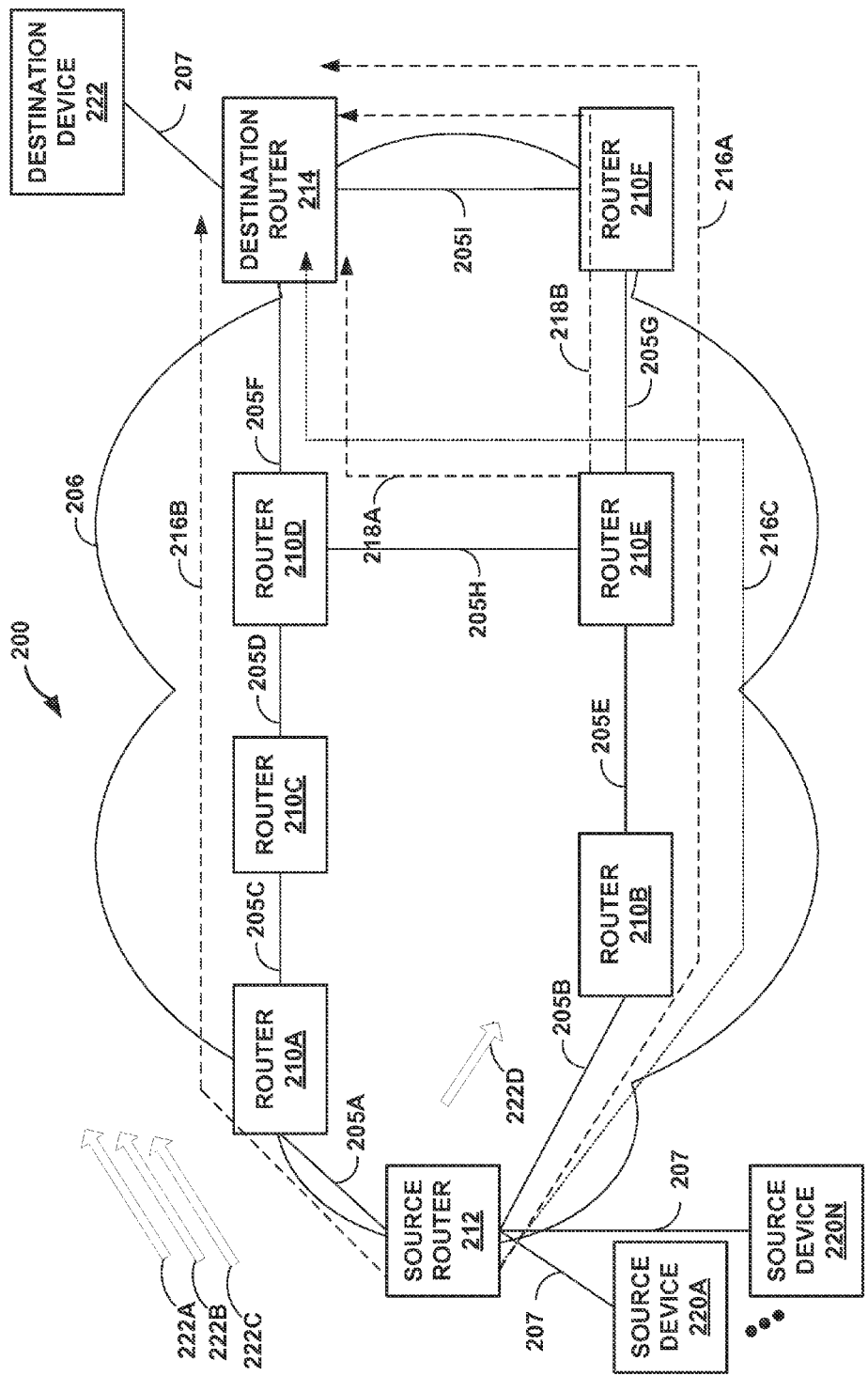
FIG. 7 is a block diagram illustrating an example network system that performs weighted ECMP techniques described in this disclosure.

FIG. 7 is a block diagram illustrating an example network system 200 that performs example weighted equal-cost multipath (ECMP) techniques described in this disclosure. Network 206 includes routers 210A-210F ("routers 210"), source router 212, and destination router 214 that route network packets, received from source devices 220A-220N (source devices 220) toward destination device 222. Network 206 may comprise a public network, such as the Internet, a private network, such as those owned and operated by an enterprise or service provider, or a combination of both public and private networks. As a result, network 206 may be alternately referred to herein as a Service Provider (SP) network. Network 206 may include one or more Wide Area Networks (WANs), Local Area Networks (LANs), Virtual Local Area Networks (VLANs), Virtual Private Networks (VPNs), and/or another type of network.

In some instances, network 206 may be an Internet Protocol (IP) network in which routers 210 use IP forwarding for transporting network packets received from source router 212. In other examples, network 206 may be an MPLS network in which routers 210 may use MPLS signaling protocols such as LDP or RSVP to establish LSPs for transporting the network packets. In some examples, network 206 may include RSVP multi-path traffic in which sub-LSPs are signaled without bandwidth reservation. Further details of RSVP multi-path using sub-LSPs are described in K. Kompella, "Multi-path Label Switched Paths Signaled Using RSVP-TE," Network Working Group, Internet-Draft, Oct. 31, 2011; and U.S. patent application Ser. No. 12/507,200, entitled "Load Balancing Network Traffic on a Label Switched Path Using Resource Reservation Protocol with Traffic Engineering," filed Jul. 22, 2009; the entire contents of each of which are incorporated herein by reference.

Thus, although shown as a single network 206 in FIG. 7, network 206 may comprise any number of interconnected networks, either public or private, in which the various networks interconnect to form various virtual networks. In addition, network 206 may include a variety of other network devices for forwarding network traffic, such as additional routers, switches, or bridges. The particular configuration of network system 200 is merely an example, and routers 210, 212, 214 may reside in a single network or within multiple networks. Routers 210, 212, 214 may be implemented as router 28 of FIG. 2, for example, and components of router 28 may operate according to the techniques set forth below with respect to FIG. 7. Although described for purposes of example with respect to routers, aspects of the techniques described herein are applicable to, and may be implemented by, other network devices, such as bridges, switches, gateways, network caches, and network acceleration devices.

Each of source devices 220A-220N and destination device 222 may be a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, or another type of device capable of interfacing with routers 212, 214 and communicating over network 206. Source devices 220 may send network traffic to source router 212 to be transmitted across network 206 and ultimately destined for destination device 222.

In the example of FIG. 7, source router 212, routers 210, and destination router 214 are interconnected by links 205A-205I ("links 205"). In some aspects, source router 212 and destination device 212 connect to source devices 220 and destination device 222 via access links 207 that may comprise wired and/or wireless communication link. The term "communication link," as used herein, comprises any form of transport medium, wired or wireless, and can include intermediate nodes such as network devices. Each of the access links may comprise, for instance, aspects of an asymmetric DSL network, WiMAX, a T-1 line, an Integrated Service Digital Network (ISDN), or wired Ethernet.

Links 205 may comprise a number of physical and virtual communication links of network 206 that interconnect routers 210 to facilitate control and data communication between the routers. Physical links of network 206 may include, for example, Ethernet PHY, Synchronous Optical Networking (SONET)/Synchronous Digital Hierarchy (SDH), Lambda, or other Layer 2 data links that include packet transport capability. Logical links of network 206 may include, for example, an Ethernet Virtual LAN, an MPLS LSP, or an MPLS-TE LSP.

Routers 210 may employ one or more interior gateway protocols (IGPs) to learn link states/metrics for communication links within the interior of network 206. For example, router 210A may use an Open Shortest Path First (OSPF) or Intermediate System-Intermediate System (IS-IS) protocol to exchange routing information with routers 210B-210F. Router 210A stores the routing information to a routing information base that the router uses to compute optimal routes to destination addresses advertised within network 206. Routers 210 execute the interior gateway protocols to communicate via routing protocol messages and exchange metrics established for the links 205 and store these metrics in a respective routing information base for use in computing optimal routes to destination addresses advertised within network 206.

In some instances, routers 210, 212, 214 support traffic engineering to improve the utilization of paths through network 206. In general, traffic engineering refers to operations to move traffic flow away from the shortest path computed by an interior gateway protocol for network 206 and toward a potentially less congested or otherwise more desirable (from an operational point of view) physical path across the network. For example, 210, 212, 214 or an administrator of network 206 may establish, using Resource Reservation Protocol with Traffic Engineering extensions (RSVP-TE) or another label distribution protocol (e.g., the Label Distribution Protocol (LDP)), one or more LSP tunnels that connect various pairs of routers 10 to route network traffic away from network failures, congestion, and bottlenecks. A router that comprises an interface to the LSP tunnel associates a metric with the LSP. An LSP metric may assume the metric of the underlying IP path over which the LSP operates or may be configured by an administrator of network 206 to a different value to influence routing decisions by routers 210, 212, 214.

Routers 210, 212, 214 execute the interior gateway protocols to communicate via routing protocol messages and exchange metrics established for the LSP tunnels and store these metrics in a respective routing information base for use in computing optimal routes to destination addresses advertised within network 206. For example, routers 210, 212, 214 may advertise LSP tunnels as IGP links of network 206 using OSPF forwarding adjacencies (FAs). As used herein, therefore, the term "link" or "communication link" may in some examples also refer to an LSP operating over a layer 2 communication link.

As described herein, source router 212, routers 210, and destination router 214 may additionally distribute detailed knowledge about network loading using extensions to the IGPs. For example, source router 212, routers 210, and destination router 214 may execute IS-IS with traffic engineering extensions described herein that use new type-length values (TLVs), such as TLV 140 described with respect to FIG. 6. As another example, source router 212, routers 210, and destination router 214 may execute OSPF with traffic engineering extensions using opaque link-state advertisements (LSAs) to distribute link attributes in link-state advertisements in addition to link-state and metrics.

In accordance with the techniques of this disclosure, source router 212 computes an amount of bandwidth associated with each of a plurality of selected paths between source router 212 and destination router 214, and load-balances traffic proportionally to each next-hop based upon the computed amounts of bandwidth to be sent to that next-hop for the paths. The methods used by source router 212 in determining how to load-balance the traffic to the next-hops based upon the computed amounts of bandwidth are referred to herein as "weighted ECMP" techniques. The WECMP techniques described herein can apply to IP and LDP traffic, as well as to RSVP multi-path traffic when the sub-LSPs are signaled without bandwidth reservation.

Although described herein for purposes of example with respect to "equal-cost" paths, the techniques of this disclosure are not limited to the use of equal-cost paths, but may be applied more broadly to paths selected on other bases. Thus, references herein to equal-cost paths or ECMP are by way of example, and are not limiting. For example, the selected paths may not each be of equal cost, but may more generally be selected as non-looping paths. A non-looping path refers to a path that does not loop back through the computing router, that is, paths between a first router (the computing router) and a second router, with each non-looping path having a respective next-hop router along the non-looping path that has a shortest path to the second router having a lower cost than a cost of a shortest path from the first router to the second router. For example, it is possible that each path presents a different cost to the destination, where each next-hop router has a lower cost shortest-path than the computing router. Essentially, that would be using downstream neighbors to provide non-looping paths. As another example, for an explicitly routed path such as RSVP-TE, the computing router might compute an arbitrary set of forwarding paths to use based upon any of a variety of constraints.

In general, source router 212 may consider the bandwidth as follows. In running the Shortest-Path-First algorithm, source router 212 stores links used on each path. Source router 212 post-processes the paths to compute final next-hop bandwidths. Source router 212 splits traffic among the outgoing interfaces based upon ratios of the bandwidths computed by the WECMP algorithm for those outgoing interfaces. One example algorithm for determining how the traffic will be split among the outgoing interfaces is described in detail below. The goal is as follows: for each destination, if no other traffic is in the network except for traffic between the computing router and the destination, it should be possible to send traffic having an amount of bandwidth equal to the WECMP-computed bandwidth associated with each primary next-hop without causing any link in the network to be overloaded.

The weighted ECMP techniques described herein can use any of a variety of advertised link bandwidths for computing the amount of bandwidth to be sent on each outgoing interface to each next-hop. As one example, the advertised link bandwidth may be a "maximum link bandwidth." The maximum link bandwidth defines a maximum amount of bandwidth capacity associated with a network link. As another example, the advertised link bandwidth may be a "residual bandwidth," i.e., the maximum link bandwidth less the bandwidth currently reserved by operation of a resource reservation protocol, such as being reserved to RSVP-TE LSPs. This is the bandwidth available on the link for non-RSVP traffic. Residual bandwidth changes based on control-plane reservations.

As a further example, the advertised link bandwidth may be an "available bandwidth" (also referred to herein as "currently available bandwidth"). The available bandwidth is the residual bandwidth less measured bandwidth used to forward non-RSVP-TE packets. In other words, the available bandwidth defines an amount of bandwidth capacity for the network link that is neither reserved by operation of a resource reservation protocol nor currently being used by the first router to forward traffic using unreserved resources. The amount of available bandwidth on a link may change as a result of SPF and weighted ECMP decisions, but may be a rolling average with bounded advertising frequency.

As one example, computing router can determine an amount of bandwidth capacity for a network link that is reserved by operation of a resource reservation protocol, and can determine an amount of bandwidth capacity that is currently being used by the router to forward traffic using unreserved resources, using traffic analysis module 60 to monitor traffic through data plane 32B, and may calculate the amount of residual bandwidth and/or available bandwidth as described above with respect to FIG. 2.

In the example of currently available bandwidth, source router 212, routers 210, and destination router 214 may advertise currently available bandwidth for the links 205 of network 206, which takes into account traffic that may otherwise be unaccounted for. That is, routers 210 can monitor and advertise currently available bandwidth for a link, expressed as a rate (e.g., MB/s), that takes into account bandwidth that is neither reserved via RSVP-TE nor currently in use to transport Internet Protocol (IP) packets or LDP packets over the link, where an LDP packet is a packet having an attached label distributed by LDP. Currently available bandwidth for a link is therefore neither reserved nor being used to transport traffic using unreserved resources. Routers 210 can measure the amount of bandwidth in use to transport IP and LDP packets over outbound links and compute currently available bandwidth as a difference between the link capacity and the sum of reserved bandwidth and measured IP/LDP packet bandwidth.

Routers 210 can exchange computed available bandwidth information for their respective outbound links as link attributes in extended link-state advertisements of a link-state interior gateway protocol and store received link attributes to a respective Traffic Engineering Database (TED) that is distinct from the generalized routing information base (including, e.g., the IGP link-state database). The computing device, such as source router 212, may execute an IGP-TE protocol 42, such as OSPF-TE or IS-IS-TE that has been extended to include new functionalities that support the WECMP techniques of this disclosure. For example, source router 212, routers 210, and destination router 214 may advertise a maximum link bandwidth, a residual bandwidth, or a currently available bandwidth for the links 205 of network 206 using TLV 140 described with respect to FIG. 6. As another example, an OSPF-TE protocol may be extended to include an OSPF-TE Express Path that advertises maximum link bandwidth, residual bandwidth and/or available bandwidth. Details on OSPF-TE Express Path can be found in S. Giacalone, "OSPF Traffic Engineering (TE) Express Path," Network Working Group, Internet Draft, September 2011, the entire contents of which are incorporated by reference herein.

Source router 212 executes a shortest-path first (SPF) algorithm over its routing information base to compute optimal forwarding paths through network 206 to destination router 214. In some instances, source router 212 may execute a constrained SPF (CSPF) algorithm over its routing information base and its traffic engineering database to compute paths for LSPs subject to various constraints, such as link attribute requirements, input to the CSPF algorithm. For example, source router 212 may execute a CSPF algorithm subject to a bandwidth constraint that requires each link of a computed path from source router 212 to destination router 214 to have at least a specified amount of maximum link bandwidth, residual bandwidth, or available bandwidth.

In the illustrated example, source router 212 computes a SPF or CSPF algorithm over its routing information and/or TED that results in multiple shortest paths 216A, 216B, and 216C ("paths 216") between source router 212 and destination router 214 having equal costs. That is, a routing cost from source router 212 to destination router 214 may be equivalent between path 216C traversing the path between devices 212-210B-210E-210D-214, path 216B traversing the path between devices 212-210A-210C-210D-214, and path 216A traversing the path between devices 212-210B-210E-210E-214. Router 210E also computes a SPF or CSPF algorithm that results in multiple shortest paths 218A and 218B ("paths 218") from router 210E to destination router 214. That is, a routing cost from router 210E to destination router 214 is equivalent between path 218A traversing devices 210E-210D-214, and devices 210E-210E-214. Paths 216 and 218 may each represent an LSP or IP path, for example. Path 216A may comprise a point-to-multipoint (P2MP) IP path or LSP.

In the example of FIG. 7, each path has its own overall path bandwidth, but paths from different next-hop routers can overlap and need to share links downstream. For example, path 216B overlaps with path 216B and path 218A and shares link 205F with these paths. As another example, path 216A and path 216C share a common sub-path, that is, the links along the portion of the paths from 212-210B-210E are shared. Routers closer to the destination see only a subset of the paths sharing a constraining link that the computing router sees. For example, router 210C sees only a path 216B on link 205F, while source router 212 sees paths 216B, 218A, and 216C on link 205F.

In accordance with the techniques of this disclosure, source router 212 runs a WECMP algorithm to identify the equal-cost forwarding paths between source router 212 and destination router 214, compute an amount of bandwidth to send on outgoing interfaces to next-hops associated with the equal-cost forwarding paths, and load-balance traffic proportionally to each next-hop based upon the computed amount of bandwidth represented by that next-hop. For example, source router 212 computes an initial amount of bandwidth based upon the minimum bandwidth associated with each link along the path. In doing this, the computing router (e.g., source router 212) also considers shared links on paths, such as link 205F, link 205G, and link 205F.

Upon determining that one of the network links is shared by multiple of the plurality of equal-cost forwarding paths, source router 212 computes an amount of bandwidth for each outgoing interface in a manner that accounts for splitting of link bandwidth of the shared network link across the multiple equal-cost forwarding paths that share the network link. One example algorithm that takes into account this splitting of link bandwidth of the shared network link across the multiple equal-cost forwarding paths includes sorting a set of nodes associated with the network links of the network that are positioned between the first router and a second router of the network, and, for each node associated with the network links of the network that are positioned between the first router and a second router of the network, beginning with a node in the network having a least cost to the second router, computing a fraction of network traffic from each node that will go across each network link to reach the destination. The computing router maximizes a sum of flows on next hop network links from the first router, subject to a constraint that for every network link that is used in the equal-cost forwarding paths, an amount of network traffic on that network link is less than or equal to a capacity of that network link, wherein the amount of network traffic on each network link is computed as a product of an amount of network traffic that will be flowing to a particular neighbor node, times a fraction of network traffic that gets loaded onto any particular downstream node. Further details of this algorithm are described below with respect to FIG. 8.

In another example, a shared link's bandwidth may be proportionally allocated among the paths, based upon each path's "computed-to-then" bandwidth. That is, source router 212 proportionally allocates the link bandwidth of the shared network link among the multiple equal-cost forwarding paths that share the network link proportional to a path bandwidth then attributed (at this point in the computation) to each of the multiple equal-cost forwarding paths. Source router 212 then sets the path bandwidth for the one of the plurality of equal-cost forwarding paths as the minimum of (i) the path bandwidth then attributed to the one of the plurality of equal-cost forwarding paths, and (ii) the link bandwidth of the path given to the one of the plurality of equal-cost forwarding paths according to the proportional allocation of the link bandwidth. Put another way, the minimum of the path's "computed-to-then" bandwidth and the shared link's bandwidth given to that path then becomes the path's new bandwidth. Source router 212 may recursively repeat the steps of proportionally allocating the link bandwidth and setting the path bandwidth for each of routers 210, beginning with the node in network 206 closest to (e.g., having a least cost to) destination router 214, until reaching the computing router.

In computing the amounts of bandwidth for the outgoing interfaces for the equal-cost forwarding paths, the computing router (e.g., source router 212) can also consider the behavior of downstream routers 210. Other routers 210 in the network 206 may or may not be running the WECMP algorithm, and may be running older forms of ECMP. Even if another router 210 is running WECMP, the other router 210 may see only a subset of the paths through what the computing router sees for a shared link. Therefore, it can be helpful for the computing router to consider the behavior of downstream routers 210, such as by computing the downstream router's load-balancing split and considering this split for all paths that go through that particular downstream router 210. Source router 212 can, when computing the amount of bandwidth, take into consideration downstream routers that do not account for splitting of link bandwidth for the shared network link across the multiple equal-cost forwarding paths that share the network link. This can decrease unnecessary congestion.

The described techniques may be performed continually to foster dynamic load balancing of packet flows over time that changes responsive to bandwidth conditions of the underlying links of path in the ECMP set. As one example, the techniques may be performed at reasonably spaced intervals so as not to cause feedback loops and oscillations in the network.

An IGP-TE protocol of source router 212, such as IGP-TE protocol 42 (FIG. 2) may be extended to include the ability to announce additional capabilities to neighboring routers, such as ECMP capabilities, and to understand when ECMP capabilities announcements are received from neighboring routers. Source router 212 can therefore send and receive a capabilities advertisement indicating whether source router 212 or downstream routers have a capability to compute bandwidth amounts to account for splitting of link bandwidth for the shared network link across the multiple equal-cost forwarding paths that share the network link. For example, IGP-TE protocol 42 may be extended to announce capabilities including whether a router supports ECMP with even weighting, ECMP with weighting proportional to interface bandwidth, ECMP with weighting based upon path bandwidth, or other capabilities relating to ECMP algorithms used by IGP-TE protocol 42. As one example, two bits from Node Capabilities may be used for announcing the ECMP capabilities, and may be defined as follows: 00—ECMP capabilities unspecified; 01—ECMP with even weighting; 10—ECMP with weighting proportional to interface bandwidth; 11—ECMP with weighting based upon path bandwidth. As with TE extensions, IS-IS can be extended to advertise parallel links.

Additionally, it is possible to identify traffic requiring certain performance characteristics (e.g., minimum latency), and source router 212 can explicitly forward that traffic on to the equal-cost path that best meets those requirements. This can be done for any characteristic that involves minimizing or pruning the topology (e.g., include-all/include-any/exclude administrative colors, links, nodes, or SRLGs). Such traffic could be identified by source router 212, for example, by a Differentiated Services Code Point (DSCP) field in the IPv4 header or IPv6 header, or an EXP field or Traffic Class field of an MPLS label stack entry.

The basic example WECMP algorithm described herein does not assume that the computing router has any knowledge of a traffic matrix. A traffic matrix refers to how much traffic is sent from router X to router Y in a given time interval (e.g., 15 minutes) from time T1 to time T2. A local traffic matrix indicates how much traffic X wants to send to each destination. However, if the traffic matrix were known, the traffic matrix could be used by the computing router when considering the behavior of downstream routers to update the bandwidths used. For example, if a downstream router X is known to have T traffic to Y, then the computing router S could reduce the path bandwidths through X by T. This would provide a layered effect. This does not yet address considering traffic to multiple destinations, but that could be done with ordering of destinations and additional complexity. As one example, ordering of destinations could be done from maximum flow to minimum flow. A global traffic matrix might also be used rather than a local traffic matrix.

An example algorithm will now be described for determining how to spread traffic to destination node D across two or more ECMP paths available to node D to maximize the amount of traffic that can get to node D, or alternately to spread as much as possible the traffic to node D in order to minimize congestion in the network. A description of variables used in the below algorithm is provided. "$C_{i,j}$" denotes the capacity of link $L_{i,j}$. "d" denotes the index into the set of nodes that indicates D (i.e., D=$N_d$). "D" denotes the "destination" node to which the computing router is loadsplitting traffic. "f" denotes the number of possible next hops from a particular node to D. "F" denotes the set of possible next hops from a particular node to D, so that F={Fi; 1<i<f}. "g,h,i,j,k" denote index variables that can be used to index into various sets/lists/matrices. "L" denotes the set of links in the network. "$L_{i,j}$" denotes the link from node $N_i$ to node $N_j$. For each destination, "$L'_{i,j}$" denotes the set of links that are used in any ECMP paths from the computing router $N_1$ to the destination D. "L'" is a subset of L.

"$M_{i,j}$" denotes the IGP metric associated with $L_{i,j}$. "n" denotes the number of nodes in the network. "N" denotes the set of nodes in the network. "$N_i$" is the $i^{th}$ node. "$N_1$" denotes the node which is doing this computation. Let N' be all the routers used on paths from the computing router to the destination. Nodes are numbered from $N_1$ to $N_d$ and D is $N_d$. "p" denotes the number of ECMP paths that exist from $N_1$ to D. "P" denotes the set of ECMP paths that exist from $N_1$ to D. Defined as {$P_i$; 1≤i≤p}. "s" denotes the number of nodes in set S. "S" denotes the set of nodes {$S_i$; 1<i<m} that appear in any of the ECMP paths from $N_1$ to D. The set S is sorted by distance from node D. During the algorithm nodes will be gradually removed from set S. "$S_{\_first}$" denotes the first node in S (i.e., of the nodes remaining in S, the one closest to D). "SumY" denotes the computed maximum each time that the Linear Programming problem is run. "X" denotes the Link traffic matrix. "$X_{i,j,k}$" is the fraction of traffic from $N_i$ to D that goes across link $L_{j,k}$. "Y" and "$Y_i$" denote variables used in the Linear Programming algorithm.

The problem is defined as follows. Given n nodes $N_i$ ($N_1$, $N_2$, ... $N_a$), the set L of links, with link $L_{i,j}$ being between nodes i and j, where the capacity of link $L_{i,j}$ is designated as $C_{i,j}$, and the IGP metric associated with link $L_{i,j}$ is designated as $M_{i,j}$. A "normal" Dijkstra has been run to compute paths between nodes, including ECMP paths.

Suppose that node $N_1$ is the computing router, and has computed ECMP paths to all other nodes in an IGP area; node $N_1$ has data traffic destined to node D (where $D=N_d$, $1<d\le n$); there are two or more ECMP paths available to node D; and node $N_1$ wants to spread the traffic across the multiple paths to maximize the amount of traffic that can get to node D (or alternately to spread as much as possible the traffic to node D in order to minimize congestion in the network). However, in this example it will also be assumed that the nodes are using IP forwarding or LDP traffic (specifically NOT using RSVP-TE or explicitly routed paths), and while node $N_1$ will spread traffic across multiple next hops as indicated by the algorithm, other nodes will only spread their traffic to equalize their traffic to D, and will not pay attention to the fact that they only have part of the traffic to forward. Initially it will be assumed that all nodes will use the same algorithm to spread traffic. In other examples, the algorithm may be extended to handle the case where some downstream nodes just split traffic equally across equal cost paths. It will be assumed that the computing router is aware of which downstream nodes are using this algorithm and which are using equal splitting, for example, by having received capabilities advertised in the IGP. The example is described for purposes of illustration in the context of FIGS. 2, 7, and 8, but the underlying principles can be applied in a variety of different contexts.

Source router 212 receives network traffic destined for destination router 214, classified to one of packet flows 222A-222D ("packet flows 222"). Source router 212 assigns each of packet flows 222 to one of paths 216 that constitute the ECMP set to destination router 214 based on the respective computed weights for paths 216, where the weights are computed based on the overall bandwidths to be sent on the outgoing interfaces for the paths 216. In general, the higher the weight value, the greater the relative proportion of network traffic that source router 212 assigns to the outgoing interface (next-hop interface) due to the computed weight. In the illustrated example, an outgoing interface associated with the outgoing interface associated with next-hop router 210A and link 205A has a higher relative path bandwidth than the outgoing interface associated with next-hop router 210B and link 205B, and source router 212 accordingly computes a higher weight for the outgoing interface associated with next-hop router 210A than for the outgoing interface associated with next-hop router 210B. Upon identifying each of packet flows 222, moreover, source router 212 assigns the respective packet flows 222 to the outgoing interface associated with next-hop router 210A according to the computed weights for the outgoing interface. Because source router 212 associates a higher weight value to the outgoing interface associated with next-hop router 210A, source router 212 assigns a plurality of the packet flows (i.e., packet flows 222A, 222B, and 222C in this example) to the outgoing interface associated with next-hop router 210A and path 216A, while assigning few packet flows (only packet flow 222D) to the outgoing interface associated with next-hop router 210B and path 216B.

The described techniques may be performed continually to foster dynamic load balancing of packet flows over time that changes responsive to available bandwidth conditions of the underlying links of path in the ECMP set. The techniques of this disclosure may improve load balancing within network 6 to cause a concomitant reduction in congestion and improved network performance. Assuming, for example, that each of packets flows 222 have similar profiles with respect to the size and rate of packets classified to the packet flows, assigning packet flows 222 based on the computed path bandwidth along each of paths 216 rather than based on round-robin techniques may provide for more equitable load balancing among paths 216, because source router 212 assigns more flows to the outgoing interface associated with next-hop router 210A having relatively higher computed amount of bandwidth than the outgoing interface associated with next-hop router 210B. This causes path 216A to carry a correspondingly larger amount of the traffic for flows 222 relative to path 216B and thereby reduces a load on path 216B, relative to equal flow distribution techniques.

Figure 8:
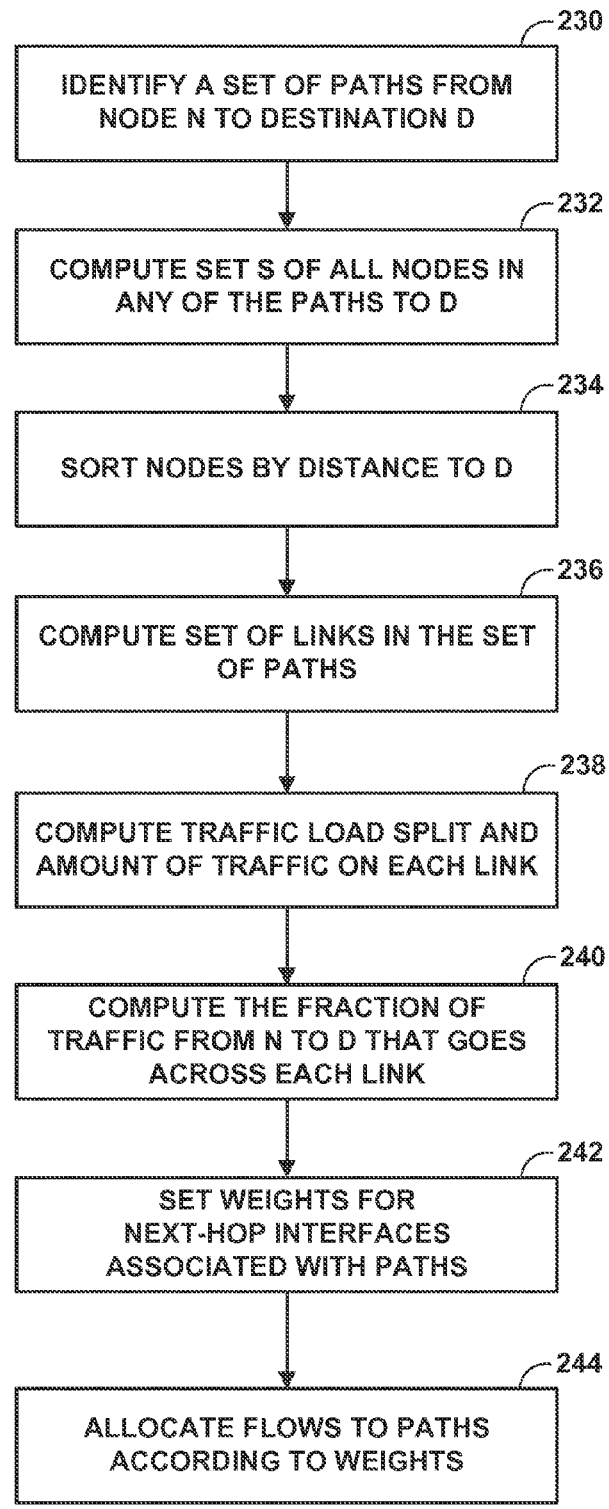
FIG. 8 is a flowchart illustrating example operation of the example router of FIG. 2 to spread network traffic across multiple ECMP paths to a destination device.

FIG. 8 is a flowchart illustrating example operation of the example router 28 of FIG. 2 to spread network traffic across multiple ECMP paths to a destination device. Although described for purposes of example with respect to router 28 of FIG. 2, the techniques can also be applied by routers 210, 212, or 214 of FIG. 7. RP daemon 40 of router 28 executes a shortest path first algorithm, such as Dijkstra's algorithm, to compute one or more paths from $N_1$ to every other node in the network (including a destination D). RP daemon 40 may execute the shortest path first algorithm over link-state information in RIB 38 to compute the ECMP paths according to IGP metrics in RIB 38. In some cases, RP daemon 40 identifies multiple equal-cost forwarding paths to a particular destination or set of destinations that satisfy one or more constraints and, in such cases, creates an ECMP set composed of the multiple equal-cost forwarding paths (230).

RP daemon 40 computes p paths from $N_1$ to D, designated as $P_1, P_2, \ldots P_p$. Define the set P to be the set of all paths from $N_1$ to D $\{P_i; 1 \le i \le p\}$. RP daemon 40 computes the set of s nodes $S=\{S_i; 1<i<s\}$ which equals all nodes in the network that appear in any of the p paths between $N_1$ and D, (including $N_1$ and D) (232). For any node that appears in two or more of the paths from $N_1$ to D it appears only once in the set S. Therefore $s \le n$. In computing S, note that all paths are equal cost paths. Therefore for any node $S_i$ which appears in two or more of the paths from $N_1$ to D, it will appear in all paths at the same distance from $N_1$, and will also appear on all paths at the same distance from D. Path weight calculator 44 sorts the nodes by distance from D, so that the first node $S_1$ is in fact D, and the $s^{th}$ node is in fact $N_1$ (234). The concept of sorting the elements of S by distance from D is therefore well defined, as it is equivalent to sorting by inverse order of distance from $N_1$. Also note that this order is just the inverse order at which nodes were moved from TENT (tentative) list to PATHS list in the normal Dijkstra algorithm. Thus, given that RP daemon 40 runs Dijkstra to compute ECMP paths, it is essentially no extra work for path weight calculator 44 to sort the nodes that appear in set S.

Path weight calculator 44 computes the set of links L' which are in the set of paths P (236). For the purpose of spreading the traffic from $N_1$ to D across ECMP paths, the set of links in L' are therefore the links which are "interesting" (links that are not in L' are not on any ECMP path from $N_1$ to D, and can therefore be ignored for the rest of this algorithm). At each step of the algorithm, path weight calculator 44 removes from S the node $S_{\_first}$ at the beginning of S (i.e., the node remaining in S that is the closest to D), and path weight calculator 44 computes two things: (i) the manner in which the traffic from $S_{\_first}$ to D will be loadsplit across the first hop of each ECMP paths from $S\_first$ to D; (ii) for any traffic from $S\_first$ to D, the amount of the traffic that will appear on every link in L' (238).

Path weight calculator 44 computes elements of a matrix X as explained below, where the element $X_{i,j,k}$ of X is the fraction of the traffic from node $N_i$ to D that will go across link $L_{j,k}$ to reach D (240). Therefore $0 \leq X_{i,j,k} \leq 1$ for all i,j,k. Initially path weight calculator 44 removes node D from S. Define $X_{d,j,k}=0$ for all j,k. Next, path weight calculator 44 removes the next node $N_h$ at the beginning of set S. Note that this will be the node that is the closest to D of the nodes that remain in S. Therefore note that $X_{i,j,k}$ has already been computed for any node i that is closer to D than $N_h$ is (for all j and k such that link $L_{j,k}$ appears in L'). Note that $N_h$ may appear on one or more of the paths from $N_1$ to D. Also, if it appears in multiple paths, for each path the next hop after $N_h$ may be the same (e.g., the paths may diverge elsewhere) or may be different (the paths may diverge at $N_h$). At this point path weight calculator 44 needs to know the set of possible next hops after $N_h$ on the paths to D. RP daemon 40 can store this information, possibly in TED 46, for each node during the Dijkstra computation so that the information is available at this time.

If there is only one next hop from $N_h$ to D, then suppose the downstream link on this path from $N_h$ goes to adjacent node $N_g$. In this case path weight calculator 44 sets:

$$X_{h,h,g}=1 \quad (1)$$

$$X_{h,j,k}=X_{g,j,k} \text{ for all } (j,k) \text{ that is not identical to } (h,g) \quad (2)$$

This implies that in this case all traffic from $N_h$ to D will go over the link from $N_h$ to $N_g$, and then further downstream this traffic will use precisely whatever paths node $N_g$ will choose. If there are multiple (two or more) next hops from $N_h$ to D, then path weight calculator 44 needs to compute the manner in which traffic from $N_h$ to D will be spread among all downstream links from $N_h$. Router 28 may restrict the number of next-hops that router 28 will use. Assume that the number of next-hops that $N_h$ will use is known as well as the tie-breakers used (e.g., next-hop loop-back address high or low). Given this knowledge, the set of potential next-hops from $N_h$ can be accurately narrowed down to the f possible next-hops.

Path weight calculator 44 defines F to be the set of possible next hops from $N_h$ to D, so that $F=\{F_i; 1<i<f\}$. Specifically, F is a list of node indexes. Thus $F_i$ is an integer, which indicates the index of the $i^{th}$ node in the set of possible next hops. Thus the $i^{th}$ choice of link for the next hop from $N_h$ to D is $L_{h,Fi}$, and this goes to node $N_{Fi}$. Similarly, the capacity of the ith link is $C_{h,Fi}$. Path weight calculator 44 defines $Y_i$ to be the total amount of traffic that router 28 would send (to maximize the total traffic) on the path from $N_h$ to its immediate neighbor $N_{Fi}$, for $1<i<f$. Path weight calculator 44 will then compute the maximum possible flow from $N_h$ to D, as the following Linear Programming problem:

$$\text{Maximize } Y = \Sigma_{1 \leq i \leq f}[Y_i] \quad (3)$$

Subject To:
for each link $L'_{j,k}$ which is in set L':

$$\Sigma_{1 \leq i \leq f}[Y_i * X_{Fi,j,k}] \leq C_{j,k}, Y_i \geq 0 \quad (4)$$

Path weight calculator 44 uses this linear programming problem of Equations (3) and (4) to maximize the traffic that flows from $N_h$ to D by maximizing the sum of the flows on the "next hop" links from $N_h$, subject to the constraint that for every link that is used in the set of ECMP paths, the amount of traffic on that link is less than or equal to the capacity of that link. The amount of traffic on each link is computed as the product of the amount of traffic that will be flowing to a particular neighbor node, times the fraction of that traffic that gets loaded onto any particular downstream node.

Having computed the flow $Y_i$ to each neighbor, path weight calculator 44 then sets:

$$\text{define Sum}Y = \text{Sum}[Y_i] 1 \leq i \leq f \quad (5)$$

$$X_{h,h,Fi} = Y_i / \text{Sum}Y 1 \leq i \leq f \quad (6)$$

$$X_{h,j,k} = \text{Sum}[X_{h,h,Fi} * X_{Fi,j,k}] 1 \leq i \leq f \quad (7)$$

for all (j,k) such that j is not equal to h.

Equation (5) defines the total traffic that can be sent, as computed by the linear programming problem of equations (3) and (4). Equation (6) sets the fraction of the traffic from node h which is sent on each of its downstream links. Equation (7) sets the traffic load for traffic from node h on all links that are further downstream.

Equation (7) states that the flow resulting on every downstream link caused by traffic from $N_h$, as a fraction of the total flow from node $N_h$ to D, is just the sum over all immediate downstream neighbors of the amount of the traffic that $N_h$ will send to that neighbor, times the fraction of the flow to that neighbor that will subsequently traverse the downstream link. Path weight calculator 44 thereby sets relative weights for the paths as the fraction of the traffic from node h which is sent on each of the downstream links (242). In this manner, path weight calculator 44 can set weights for the ECMP path interfaces in a way that considers the behavior of downstream routers. Path weight calculator 44 stores the weights to weights 58. A relatively higher computed weight indicates a greater amount of minimum available bandwidth for a path in the ECMP set relative to the other paths. Multipath forwarding component 56 allocates new packet flows destined for destinations served by the ECMP set and identified by the classifier 74 to paths in the ECMP set in accordance with respective weights 58 for the paths (244).

An example matrix X computed for the example network of FIG. 7 is shown below in Table 1.

TABLE 1

| | Nodes | | | | | | |
|---|---|---|---|---|---|---|---|
| Links | SD 212 | R 210A | R 210B | R 210C | R 210D | R 210E | R 210F |
| SD 212 → R 210A | 0.5 | 0 | 0 | 0 | 0 | 0 | 0 |
| SD 212 → R 210B | 0.5 | 0 | 0 | 0 | 0 | 0 | 0 |
| R 210A → R 210C | 0.5 | 1 | 0 | 0 | 0 | 0 | 0 |
| R 210B → R 210E | 0.5 | 0 | 1 | 0 | 0 | 0 | 0 |
| R 210E → R 210F | 0.25 | 0 | 0.5 | 0 | 0 | 0.5 | 0 |
| R 210C → R 210D | 0.5 | 1 | 0 | 1 | 0 | 0 | 0 |
| R 210D → DD 214 | 0.75 | 1 | 0.5 | 1 | 1 | 0.5 | 0 |
| R 210F → DD 214 | 0.25 | 0 | 0.5 | 0 | 0 | 0.5 | 1 |
| R 210E → R 210D | 0.25 | 0 | 0.5 | 0 | 0 | 0.5 | 0 |

In the example of FIG. 7, each element of the matrix X represented by Table 1 represents element $X_{i,j,k}$ of X is the fraction of the traffic from node $N_i$ to D that will go across link $L_{j,k}$. So, for example, the element $X_{SD\ 212,SD\ 212,R\ 210A}$ is the fraction of the traffic from node source device (SD) 212 that will go across the link from SD 212 to router 210A (link 205A of FIG. 7). The elements $X_{i,j,k}$ are calculated as follows for the example of Table 1. Starting with router 210F, router 210F sends all of its traffic originally from source 212 device on link 205I between R 210F→DD 214, so element $X_{R\ 210F,R\ 210F,DD\ 214}$ has a value of 1, and all other elements in column R 210F have 0 values. Similarly, router 210D sends all of its traffic originally from source 212 device on link 205I between R 210F→DD 214, so element $X_{R\ 210D,R\ 210D,DD\ 214}$ has a value of 1, and all other elements in column R 210F have 0 values. In the example of FIG. 7, router 210D does not send any traffic over link 205H because router 210D takes the shortest path to destination router 214, which, assuming all of links 205 are of equal cost, is over link 205F.

Router 210E will send half of its traffic over link 205G (R 210E→R 210F) to router 210F and half of its traffic over link 205H to router 210D (R 210E→R 210D). Thus, elements $X_{R\ 210E,R\ 210E,R\ 210F}$ and $X_{R\ 210E,R\ 210E,R\ 210D}$ each have values of 0.5. In turn, as mentioned above, router 210F will send all of that traffic from router 210E on to destination router 214, so element $X_{R\ 210E,R\ 210F,DD\ 214}$ can be computed by multiplying 0.5*1=0.5. In a similar manner, element $X_{R\ 210E,R\ 210D,DD\ 214}$ can be computed by multiplying 0.5*1=0.5.

Router 210C sends all of its traffic over link 205D to router 210D, so element $X_{R\ 2100,R\ 210C,R\ 210D}$ has a value of 1, and then router 210D in turn sends all of this traffic from router 210C over link 205F as discussed above, so element $X_{R\ 210C,R\ 210D,DD\ 214}$ has a value of 1*1=1. Similarly, router 210A sends all of its traffic over link 205C to router 210A, so element $X_{R\ 210A,R\ 210A,R\ 210C}$ has a value of 1, and then router 210C in turn sends all of this traffic from router 210D over link 205D as discussed above, so element $X_{R\ 210A,R\ 210C,R\ 210D}$ has a value of 1*1=1.

Router 210B sends all of its traffic to router 210E over link 205E, so element $X_{R\ 210B,R\ 210B,R\ 210E}$ has a value of 1. Router 210E will distribute the traffic from router 210B according to the same ratios as previously calculated so the rest of the elements of the router 210B column can be copied over from the router 210E column.

Source router 212 sends half its traffic over link 205A to router 210A, and half its traffic over link 205B to router 210B, so elements $X_{SD\ 212,SD\ 212,R\ 210A}$ and $X_{SD\ 212,SD\ 212,R\ 210B}$ are each a value of 0.5. Following equation (7) above, the remaining values are as shown in Table 1.

Due to the nature of the Linear Programming problem of Equations (2) and (3), there may not be a single unique solution, i.e., multiple solutions are possible. As a result, a downstream node might happen to come up with a different solution than an upstream node expects it to. The impact of this issue can potentially be decreased by first computing the maximum traffic that can be supported from $N_h$ to D, and then with the added constraint that the total traffic (sum of $Y_i$) will be this large, minimize the traffic on the busiest link out of $N_h$. In principle, this could be done using two separate linear programming computations. However, this may be wasteful of computation resources and may run into a potential issue with roundoff error (since this involves adding a constraint that is only barely possible, a roundoff error could make it appear not feasible). It may be relatively straightforward part way through the algorithm to add a constraint and change the objective function. Another solution might be maximize a number of next-hops used while minimizing the ratio between any two $Y_i$, although this is not linear.

One example approach for finding a deterministic solution that attempts to equalize the flows and have a minimal number of different values is as follows. The idea is to keep trying to send equivalent amounts of traffic.

a) Start by assuming that all $X_i$ are equal and equal $Z_j$.
b) Solve for Z.
c) Remove from the problem any $Y_i$ in equations that are at equality. Remove those equations also. Set the solution for those $Y_i$ as equal to $Z_j$.
d) Repeat from (a) with the remaining values assuming that they are equal to $Z_{j+1} \leq Z_j$
e) Problem is complete when $Y_i$ all have a solution set.

Another example approach for finding a deterministic solution that attempts to equalize the flows is to start with a fixed bandwidth unit, and then do a round-robin operation adding that to the bandwidth sent to each neighbor in turn. If the added bandwidth causes a link capacity to be violated, then the added bandwidth is removed and the neighbor is removed from the round-robin. This continues until all neighbors have been removed.

As described above, the IGP-TE used by routers may be extended to include the ability to announce ECMP capabilities to neighboring routers. The example algorithm above may be enhanced to handle the possibility that some downstream nodes can only do equal load-splitting across all possible equal cost immediate downstream neighbors. Dealing with downstream nodes that do not do load-splitting at all runs into the problem that if the downstream node has two equal cost ways to get to D, the computing router may not know which one the downstream node uses. Similarly if a downstream node can only split equally across two neighbors, and the downstream node in fact has four equal cost downstream neighbors, then computing router may not know which two of its four downstream neighbors the downstream node will choose.

In a router implementation, there are only so many different next-hops that can be used. This is caused by forwarding plane restrictions and configuration. Dynamically allocating next-hops in the SPF computation need not be a cause. Regardless, this restricting from all next-hops is done in the SPF and needs to be accounted for in the ECMP traffic-weighting algorithm. Generally, routers may do one of three things: (1) Use the next-hop router's loopback address as a tie-breaker and keep the next-hops corresponding to the numerically lowest loopback-addresses; (2) Use the next-hop router's loopback address as a tie-breaker and keep the next-hops corresponding to the numerically highest loopback-addresses. (3) Keep the first next-hops encountered and discard the rest. If it is known that a router is doing (1) or (2) and what its maximum count of next-hops are, then this information can be used to select the subset of the possible next-hops from $N_h$ that $N_h$ would have picked. This reduced set can then be used instead. Option (3) requires running an identical SPF algorithm as $N_h$ has run, which may not be very practical. This also requires that the algorithm not prune equal-cost paths and keep a list of back-pointers so that the full paths-set can be known.

Various examples have been described. These and other examples are within the scope of the following claims.

The invention claimed is:

1. A method comprising:
receiving, with a first router of a network, a link bandwidth for each of one or more network links of the network that are positioned between the first router and a second router of the network;
selecting, with the first router, a plurality of forwarding paths from the first router to the second router that each satisfy a constraint;
determining that one of the network links is a common network link shared by multiple forwarding paths of the plurality of forwarding paths and positioned between the second router and a downstream router that is positioned between the first router and the second router along at least one of the forwarding paths;
computing, by the first router, an amount of bandwidth that can be sent on an outgoing interface of the first router to a neighbor node on the multiple forwarding paths that share the common network link, wherein computing the amount of bandwidth comprises (i) accounting for splitting of the link bandwidth of the common network link across the multiple forwarding paths that share the common network link, and (ii) when the first router determines that the downstream router is not configured to account for splitting of the link bandwidth for the common network link across the multiple forwarding paths that share the common network link when the downstream router computes an amount of bandwidth that can be sent on an outgoing interface of the downstream router, computing the bandwidth based on a capability of the downstream router in load balancing received traffic across multiple next hops of the downstream router;

selectively assigning, with the first router, packet flows to each of a plurality of outgoing interfaces of the first router based at least on the computed amount of bandwidth;

receiving packets for the packet flows with the first router; and forwarding packets of each of the packets flows to the respective one of the plurality of outgoing interfaces to which the packet flow is assigned.

2. The method of claim 1, further comprising receiving a capabilities advertisement indicating whether the downstream router has a capability to account for splitting of link bandwidth for the shared network link across the multiple forwarding paths that share the network link.

3. The method of claim 1, wherein computing the amount of bandwidth to account for splitting of link bandwidth comprises:

for each node associated with the network links of the network that are positioned between the first router and the second router of the network, beginning with a node in the network having a least cost to the second router, computing a fraction of network traffic from each node that will go across each network link to reach the second router; and maximizing a sum of flows on next hop network links from the first router, subject to a constraint that for every network link that is used in the forwarding paths, an amount of network traffic on that network link is less than or equal to a capacity of that network link, wherein the amount of network traffic on each network link is computed as a product of an amount of network traffic that could flow to a particular neighbor node, times a fraction of network traffic that is loaded onto any particular downstream link associated with a neighbor node.

4. The method of claim 3, wherein the capacity of the network link comprises one of a total capacity of the link, a residual bandwidth capacity of the link, and an available bandwidth capacity of the link.

5. The method of claim 1, wherein computing the amount of bandwidth comprises, for one of the plurality of forwarding paths:

proportionally allocating the link bandwidth of the common network link among the multiple forwarding paths that share the common network link proportional to an amount of bandwidth then attributed to each of the multiple forwarding paths; and setting the amount of bandwidth for the one of the plurality of forwarding paths as the minimum of (i) the amount of bandwidth then attributed to the one of the plurality of forwarding paths; and (ii) a portion of the link bandwidth of the path allocated to the one of the plurality of forwarding paths according to the proportional allocation of the link bandwidth.

6. The method of claim 5, further comprising:

for each node associated with the network links of the network that are positioned between the first router and the second router of the network, beginning with a node in the network having a least cost distance to the second router, repeating the steps of proportionally allocating the link bandwidth and setting the amount of bandwidth.

7. The method of claim 1, wherein the packet flows include a first packet flow and a second packet flow, wherein each of the packets for the first packet flow and the second packet flow includes an Internet Protocol (IP) header, wherein the first router selectively assigns the first packet flow to the outgoing interface based at least on the computed amount of bandwidth for the outgoing interface, and wherein the first router selectively assigns the second packet flow to a second outgoing interface of the first router based at least on a computed amount of bandwidth for the second outgoing interface.

8. The method of claim 1, wherein the packet flows include a first packet flow and a second packet flow, wherein each of the packets for the first packet flow and the second packet flow includes a label for a single Resource Reservation Protocol with Traffic Engineering extensions (RSVP-TE) signaled label switched path (LSP), wherein the first router selectively assigns the first packet flow to a first one of the plurality of forwarding paths based at least on a computed path bandwidth for the first one of the plurality of forwarding paths, and wherein the first router selectively assigns the second packet flow to a second one of the plurality of forwarding paths based at least on a computed path bandwidth for the second one of the plurality of forwarding paths.

9. The method of claim 1, further comprising:

determining, with the first router, a weight for each of the plurality of forwarding paths that is based at least on the computed amount of bandwidth for each of the plurality of forwarding paths; and selectively assigning, with the first router, packet flows to each of the plurality of forwarding paths based at least on the weight for each of the plurality of forwarding paths.

10. The method of claim 1, wherein selecting the plurality of forwarding paths that each satisfy the constraint comprises selecting a plurality of non-looping paths from the first router to the second router, wherein each of the plurality of non-looping paths has a respective next-hop router along the respective non-looping path, wherein each of the respective next hop routers has a respective shortest path to the second router having a lower cost than a cost of a shortest path from the first router to the second router.

11. The method of claim 1, wherein selecting the plurality of forwarding paths that each satisfy the constraint comprises selecting a plurality of equal-cost forwarding paths from the first router to the second router.

12. The method of claim 11, further comprising:

generating an equal-cost multipath (ECMP) set comprising the plurality of equal-cost forwarding paths.

13. The method of claim 12, determining, with the first router, a weight for each of the plurality of equal-cost forwarding paths in the ECMP set that is based at least on the computed amount of bandwidth for each of the plurality of equal-cost forwarding paths in the ECMP set;

generating, with the first router, respective next-hops for each of the plurality of equal-cost forwarding paths in the ECMP set;

installing, with the first router, the next-hops to forwarding information of the first router;

associating, with the first router, the weight for each of the plurality of equal-cost forwarding paths in the ECMP set with the next-hop for the forwarding path; and selectively assigning, with the first router, packet flows to next-hops based at least on the weights associated with the next-hops.

14. The method of claim 1, wherein receiving the link bandwidth comprises receiving a maximum link bandwidth for each of the one or more network links, wherein the maximum link bandwidth defines a maximum amount of bandwidth capacity associated with a network link.

15. The method of claim 1, wherein receiving the link bandwidth comprises receiving a residual bandwidth for each of the one or more network links, wherein the residual bandwidth defines an amount of bandwidth capacity for a network link that is a maximum link bandwidth less a bandwidth of the network link reserved by operation of a resource reservation protocol.

16. The method of claim 1, wherein receiving the link bandwidth comprises receiving an available bandwidth for each of the one or more network links, wherein the available bandwidth defines an amount of bandwidth capacity for the network link that is neither reserved by operation of a resource reservation protocol nor currently being used by the first router to forward traffic using unreserved resources.

17. The method of claim 1, wherein forwarding the packets comprises forwarding Internet Protocol (IP) packets having IP headers.

18. The method of claim 1, wherein the network links comprise Label Distribution Protocol (LDP) label switched paths (LSPs), wherein forwarding the packets comprises forwarding packets having LDP labels.

19. The method of claim 1, wherein the network links comprise Resource Reservation Protocol with Traffic Engineering extensions (RSVP-TE) label switched paths (LSPs), wherein forwarding the packets comprises forwarding packets having RSVP-TE labels.

20. The method of claim 19, wherein at least one of the RSVP-TE LSPs is a multi-path LSP having sub-LSPs signaled without bandwidth reservation.

21. The method of claim 1, wherein selectively assigning packet flows comprises identifying a packet flow as requiring at least one performance characteristic, and assigning the identified packet flow to one of the plurality of forwarding paths that satisfies the performance characteristic.

22. The method of claim 1, wherein identifying a plurality of forwarding paths comprises identifying the plurality of forwarding paths up to a configured maximum number of forwarding paths.

23. The method of claim 1, wherein the common network link is directly coupled to the downstream router.

24. A network device comprising:
a control unit comprising one or more processors;
a routing protocol software of the control unit to receive a link bandwidth for each of one or more network links of a network that are positioned between the network device and a second network device of the network, wherein the routing protocol software is adapted to execute a routing protocol to select plurality of forwarding paths from the network device to the second network device that each satisfy a constraint;

a path weight calculator of the control unit to determine that one of the network links is a common network link shared by multiple forwarding paths of the plurality of forwarding paths and positioned between the second network device and a downstream router that is positioned between the network device and the second network device along at least one of the forwarding paths, and, in response to determining that the one of the network links is a common network link shared by multiple of the plurality of forwarding paths, compute an amount of bandwidth that can be sent on an outgoing interface of the network device to a neighbor node on the multiple forwarding paths that share the one of the network links, wherein in computing the amount of bandwidth the path weight calculator (i) accounts for splitting of the link bandwidth of the shared network link across the multiple forwarding paths that share the common network link, and (ii) when the first router determines that the downstream router is not configured to account for splitting of the link bandwidth for the common network link across the multiple forwarding paths that share the common network link when the downstream router computes an amount of bandwidth that can be sent on an outgoing interface of the downstream router, computing the bandwidth based on a capability of the downstream router in load balancing received traffic across multiple next hops of the downstream router;

a multipath forwarding component of the control unit to selectively assign packet flows to each of a plurality of outgoing interfaces of the network device based at least on the computed amount of bandwidth; and one or more interface cards to receive packets for the packet flows, wherein the multipath forwarding component forwards packets of each of the packets flows to the respective one of the plurality of outgoing interfaces to which the packet flow is assigned.

25. The network device of claim 24, wherein one of the interface cards receives a capabilities advertisement indicating whether the downstream router has a capability to account for splitting of link bandwidth for the common network link across the multiple forwarding paths that share the common network link.

26. The network device of claim 24, wherein the path weight calculator is adapted to:
for each node associated with the network links of the network that are positioned between the first router and the second router of the network, beginning with a node in the network having a least cost to the second router, compute a fraction of network traffic from each node that will go across each network link to reach the second router; and maximize a sum of flows on next hop network links from the first router, subject to a constraint that for every network link that is used in the forwarding paths, an amount of network traffic on that network link is less than or equal to a capacity of that network link, wherein the amount of network traffic on each network link is computed as a product of an amount of network traffic that could flow to a particular neighbor node, times a fraction of network traffic that is loaded onto any particular downstream link associated with a neighbor node.

27. The network device of claim 26, wherein the capacity of the network link comprises one of a total capacity of the link, a residual bandwidth capacity of the link, and an available bandwidth capacity of the link.

28. The network device of claim 24, wherein the path weight calculator is adapted to, for one of the plurality of forwarding paths:
   proportionally allocate the link bandwidth of the shared network link among the multiple forwarding paths that share the network link proportional to an amount of bandwidth then attributed to each of the multiple forwarding paths; and
   set the amount of bandwidth for the one of the plurality of forwarding paths as the minimum of (i) the amount of bandwidth then attributed to the one of the plurality of forwarding paths; and (ii) a portion of the link bandwidth of the path allocated to the one of the plurality of forwarding paths according to the proportional allocation of the link bandwidth.

29. The network device of claim 28, wherein the path weight calculator is adapted to:
   for each node associated with the network links of the network that are positioned between the first router and the second router of the network, beginning with a node in the network having a least cost distance to the second router, repeat the steps of proportionally allocating the link bandwidth and setting the amount of bandwidth.

30. The network device of claim 24, wherein the path weight calculator is adapted to determine a weight for each of the plurality of forwarding paths that is based at least on the computed amount of bandwidth for each of the plurality of forwarding paths, and selectively assign packet flows to each of the plurality of forwarding paths based at least on the weight for each of the plurality of forwarding paths.

31. The network device of claim 24, wherein the plurality of forwarding paths comprises a plurality of equal-cost forwarding paths, and wherein the routing protocol software is adapted to generate an equal-cost multipath (ECMP) set comprising the plurality of equal-cost forwarding paths.

32. The network device of claim 31, further comprising:
   forwarding information; and
   a flow table that includes a respective packet flow entry for each of the packet flows,
   wherein the path weight calculator determines a weight for each of the plurality of equal-cost forwarding paths in the ECMP set that is based at least on the computed amount of bandwidth for each of the plurality of equal-cost forwarding paths in the ECMP set,
   wherein the routing protocol software generates respective next-hops structures for each of the plurality of equal-cost forwarding paths in the ECMP set and installs the next-hop structures to the forwarding information,
   wherein the multipath forwarding component associates the weight for each of the plurality of equal-cost forwarding paths in the ECMP set with the next-hop structure for the forwarding path, and
   wherein the multipath forwarding component selectively assigns packet flows to next-hop structures based at least on the weights associated with the next-hop structures and, for each packet flow, sets within the respective packet flow entry for the packet flow a reference to the assigned next-hop structure for the packet flow in the forwarding information.

33. The network device of claim 24, wherein the link bandwidth comprises one of:
   a maximum link bandwidth for each of the one or more network links, wherein the maximum link bandwidth defines a maximum amount of bandwidth capacity associated with a network link;
   a residual bandwidth for each of the one or more network links, wherein the residual bandwidth defines an amount of bandwidth capacity for a network link that is a maximum link bandwidth less a bandwidth of the network link reserved by operation of a resource reservation protocol; and
   an available bandwidth for each of the one or more network links, wherein the available bandwidth defines an amount of bandwidth capacity for the network link that is neither reserved by operation of a resource reservation protocol nor currently being used by the first router to forward traffic using unreserved resources.

34. A non-transitory computer-readable storage medium comprising instructions for causing a programmable processor to:
   receive a link bandwidth for each of one or more network links of a network that are positioned between a first router and a second router of the network;
   select a plurality of forwarding paths from the first router to the second router that each satisfy a constraint;
   determine that one of the network links is a common network link shared by multiple forwarding paths of the plurality of forwarding paths and positioned between the second router and a downstream router that is positioned between the first router and the second router along at least one of the forwarding paths;
   compute an amount of bandwidth that can be sent on an outgoing interface of the first router to a neighbor node on the multiple forwarding paths that share the one of the network links, wherein computing the amount of bandwidth comprises (i) accounting for splitting of the link bandwidth of the common network link across the multiple forwarding paths that share the common network link, and (ii) when the first router determines that the downstream router is not configured to account for splitting of the link bandwidth for the common network link across the multiple forwarding paths that share the common network link when the downstream router computes an amount of bandwidth that can be sent on an outgoing interface of the downstream router, computing the bandwidth based on a capability of the downstream router in load balancing received traffic across multiple next hops of the downstream router;
   selectively assign packet flows to each of a plurality of outgoing interfaces of the first router based at least on the computed amount of bandwidth;
   receive packets for the packet flows with the first router; and
   forward packets of each of the packets flows to the respective one of the plurality of outgoing interfaces to which the packet flow is assigned.

35. The method of claim 1, wherein the common network link is positioned between the first router and the second router at least one hop away from the first router and along each of the multiple of the plurality of forwarding paths.

* * * * *